Dec. 27, 1966  G. GOULD  3,295,067
ELECTROMAGNETIC AMPLIFICATION UTILIZING A CONSTANT LOSS MEDIUM
AND SUB-CENTIMETER WAVE LENGTH APPARATUS THEREFOR
Filed May 21, 1962  6 Sheets-Sheet 1

INVENTOR.
GORDON GOULD
BY Darby & Darby
ATTORNEYS

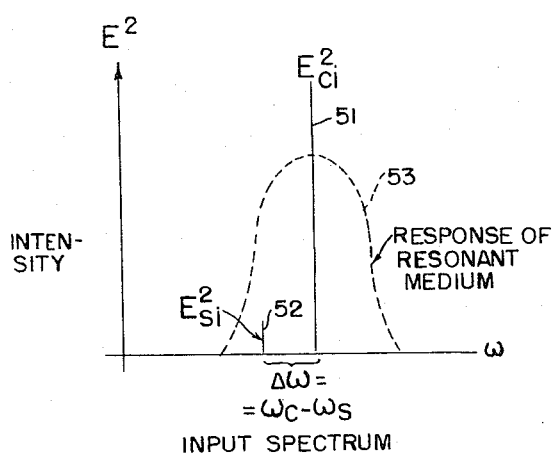
FIG. 5a INPUT SPECTRUM
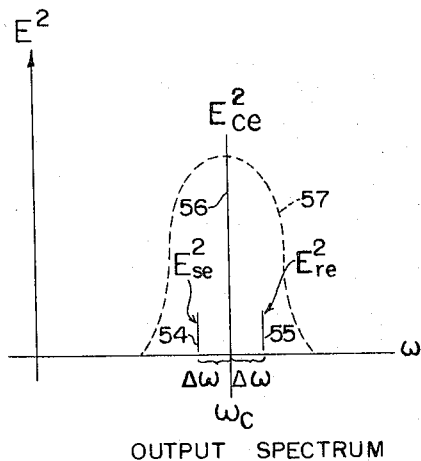
FIG. 5b OUTPUT SPECTRUM
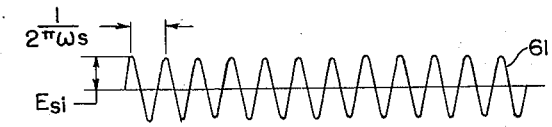
FIG. 6a
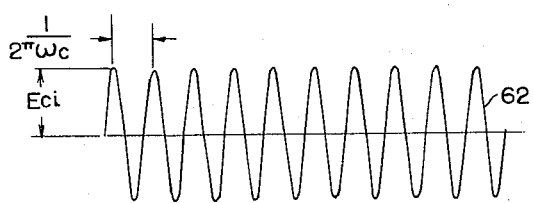
FIG. 6b
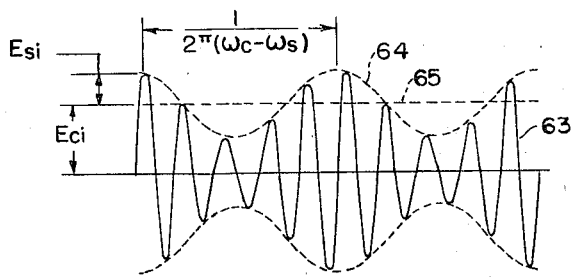
FIG. 6c

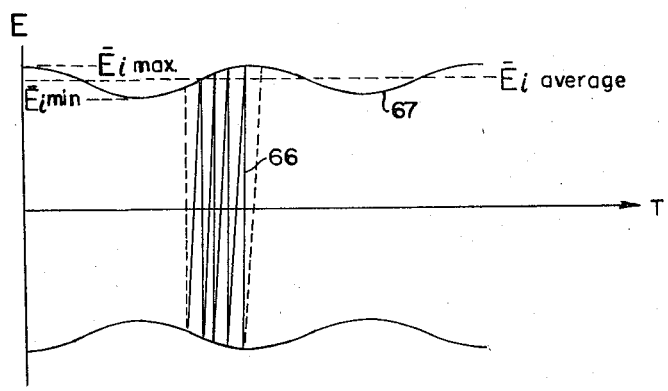
FIG. 6d
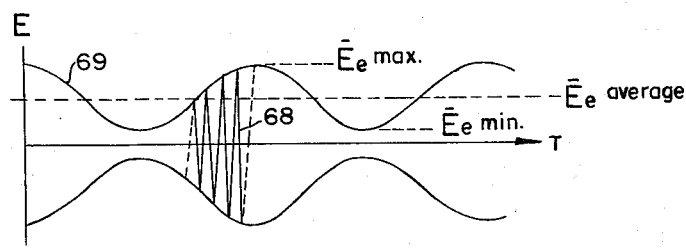
FIG. 6e
FIG. 7
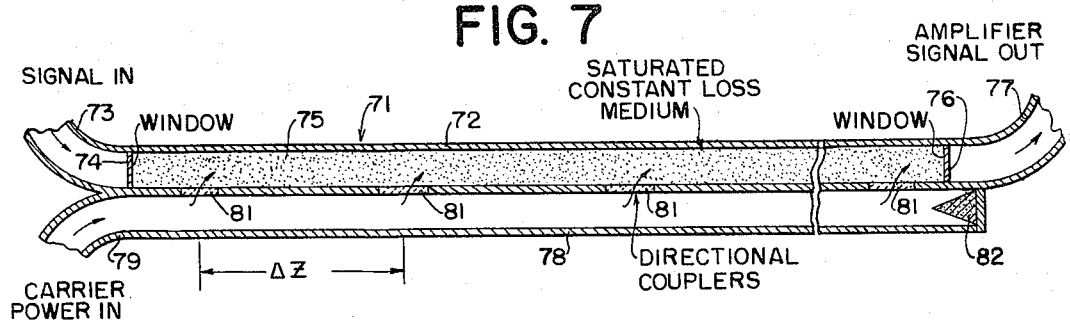
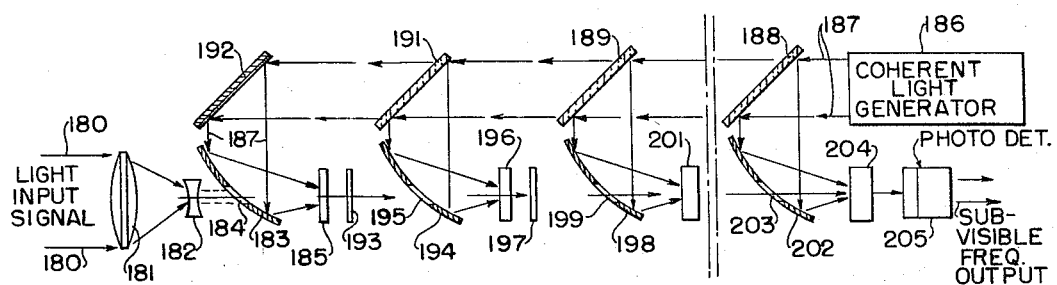
FIG. 8

Dec. 27, 1966 G. GOULD 3,295,067
ELECTROMAGNETIC AMPLIFICATION UTILIZING A CONSTANT LOSS MEDIUM
AND SUB-CENTIMETER WAVE LENGTH APPARATUS THEREFOR
Filed May 21, 1962 6 Sheets-Sheet 4

INVENTOR.
GORDON GOULD
BY *Darby & Darby*
ATTORNEYS

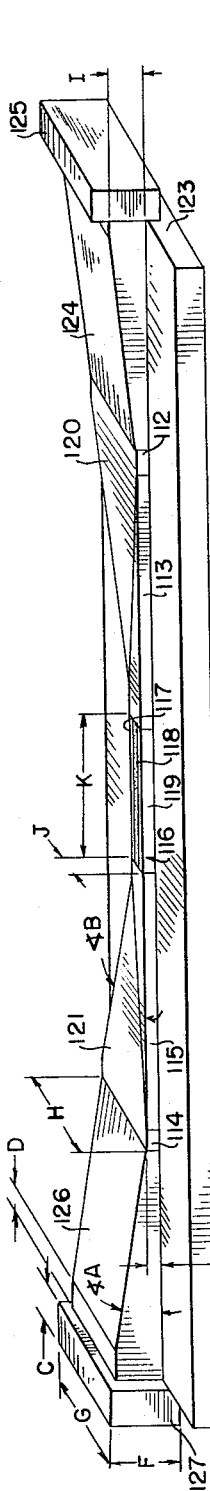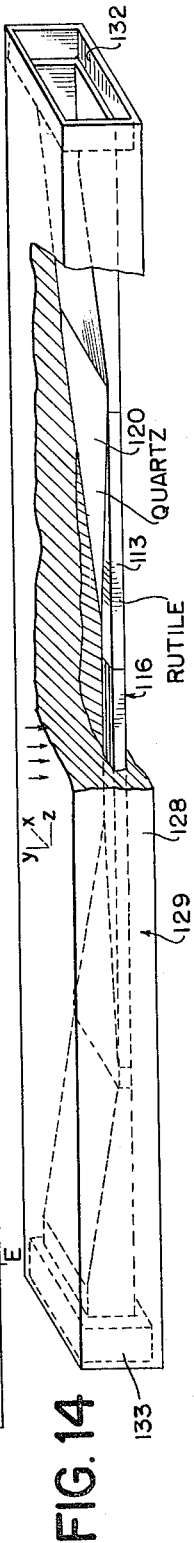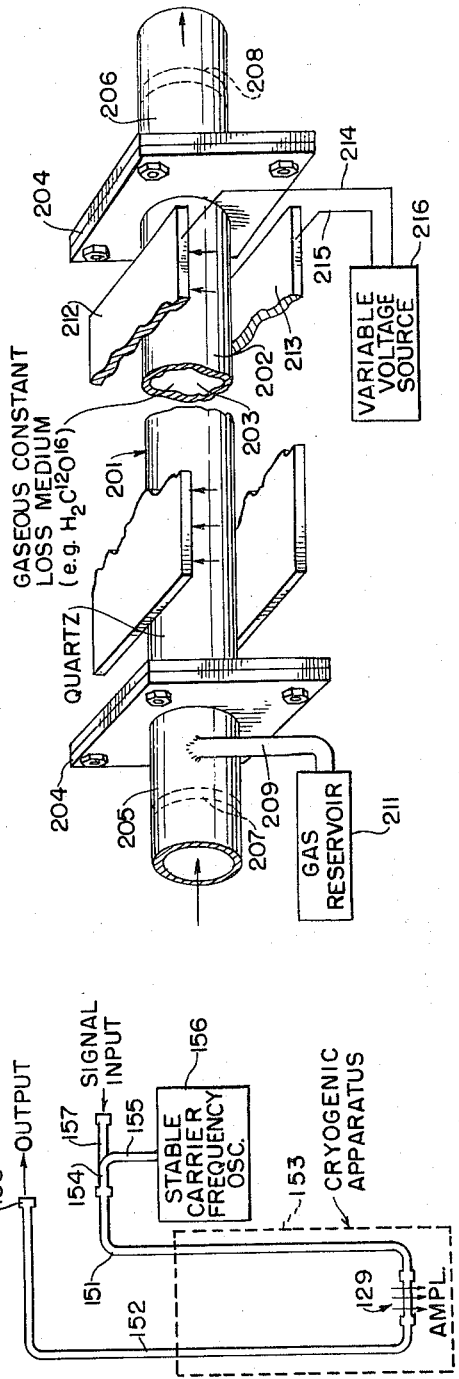

INVENTOR.
GORDON GOULD
BY Darby & Darby
ATTORNEYS

United States Patent Office 3,295,067
Patented Dec. 27, 1966

3,295,067
ELECTROMAGNETIC AMPLIFICATION UTILIZING A CONSTANT LOSS MEDIUM AND SUB-CENTIMETER WAVE LENGTH APPARATUS THEREFOR
Gordon Gould, Bronx, N.Y., assignor, by mesne assignments, to Control Data Corporation, South Minneapolis, Minn., a corporation of Minnesota
Filed May 21, 1962, Ser. No. 196,285
30 Claims. (Cl. 330—5)

The present invention relates to electromagnetic amplifiers wherein a medium is employed having a characteristic of substantially constant power loss irrespective of the magnitude of impinging power. The invention further relates to the method of, and the apparatus for, propagating an input signal together with a carrier signal through the constant loss medium, whereby an increase in the amplitude of the input signal is obtained in a manner which will hereinafter be more fully explained.

In pointing out the novelty and advantages of the present invention, it will be useful to first explain what is meant by a "constant loss" medium. It should be pointed out that "constant loss media" as herein described, differ from the usual non-linear circuit elements or media used in amplifier apparatus. An example of an idealized characteristic of a constant loss medium would be one which had a linear power absorption factor up to a predetermined saturation power value. That is, below the saturation value a constant proportion of the impinging power of an electromagnetic field would be absorbed. However, for power values above the saturation value, the idealized constant loss medium would be unable to absorb further power and the amount of power absorbed would remain substantially constant for values of impinging power above the saturation value. The response of the constant loss medium to variations in power will normally be relatively slow compared with the most rapid variations in field magnitude, so that the power response is in fact determined by an average power value over at least several cycles. In the explanation of the operation of the constant loss amplifier, it will be seen that the slow power response time does not represent the limitation on the upper cut-out frequency of the amplifier.

The description of constant loss medium may also be approached mathematically.

Let the power lost in a medium be given by $$\Delta P = -(\text{constant})P$$

where $\Delta P$ is short term (a few cycles of carrier) average power loss and P is the power transmitted through the medium. This equation defines the usual "linear" loss. Signal and "carrier" powers at different frequencies are proportionately reduced. No new signals are generated.

$$\Delta P = -(\text{constant})$$

defines the ideal constant power loss medium. If the signal power is less than the "carrier" or "saturating" power at a different frequency, then it has been shown that the signal is amplified at the expense of carrier power.

More generally, one may write $$\Delta P = -(\text{constant})P^n$$

for some range of power. Then for $1 > n > 0$, the medium is not "linear" and one may still get amplification of the signal, which may be of useful magnitude depending on how great are the other losses in the system.

Therefore, a substantially constant loss medium is defined herein as one in which the residual dependence on power of the power loss is sufficiently small to allow amplification of the type occurring in an ideal constant loss medium.

Contrast the above-described constant loss medium characteristic with the usual non-linear circuit element. In a semiconductor diode, for example, the instantaneous current is a non-linear function of the instantaneous applied voltage. It will be noted that in the case of conventional non-linear circuit elements, there may be an inherent distortion of sinusoidal waveforms. Amplifiers using constant loss media according to the present invention, however, do not have an inherent distortion for sinusoidal waveforms, since there need not be any non-linearity with respect to signal variations with a cyclic period on the order of the period of the frequency about which the amplifier is operated.

As the constant loss amplifier is more fully explained, it will be appreciated that it is distinctly different from and has unique advantages with respect to previously known amplifiers such as negative resistance amplifiers, parametric amplifiers, and masers. One such advantage is suitability for millimeter and sub-millimeter wavelength amplification.

Accordingly, in addition to the features and advantages suggested above, it is an object of the present invention to provide an amplifier and an amplification method whereby a constant loss medium is utilized to increase the amplitude of an input signal having a first frequency by virtue of absorption of the combination of the input signal with a carrier signal having a second frequency.

It is another object of the present invention to provide such amplifying apparatus and method wherein the constant loss medium has such a constant loss characteristic by virtue of atomic or molecular energy level transitions.

It is still another object of the present invention to provide such an apparatus and method wherein the constant loss medium is a solid state material.

It is still another object of the present invention to provide such apparatus and method wherein the constant loss medium is rutile doped with an impurity such as iron, chromium, or the like, and the electromagnetic radiation to be amplified is of millimeter wavelength and is transmitted through a waveguide transmission line, a section of which is filled with the constant loss medium.

It is a further object of the present invention to provide an amplifying apparatus and method whereby a constant loss medium is employed to amplify a light-frequency electromagnetic signal by virtue of the absorption of such signal combined with a locally generated carrier signal in the constant loss medium.

Further objects and advantages of the invention will be apparent upon consideration of the following description in conjunction with the appended drawings, in which:

FIGURE 5a is a spectrum diagram of input signals useful in explaining the invention;

FIGURE 5b is a spectrum diagram of output signals useful in explaining the invention;

FIGURES 6a through 6e are waveform diagram utilized in explaining the operation of the apparatus according to the invention;

FIGURE 7 is a partially schematic sectional diagram of amplifier apparatus for radio-frequency amplification according to the present invention;

FIGURE 8 is a schemaitc diagram of amplifier apparatus for the amplification of light-frequency electromagnetic radiation according to the invention.

FIGURES 9 through 14 are isometric views illustrating a particular structure for a solid-state amplifier according to the present invention for electromagnetic radiation of millimeter wavelength, and the method of fabrication thereof;

FIGURE 15 is a schematic diagram of the arrangement of the apparatus of FIGURE 14 in a complete system with a carrier frequency oscillator to supply the carrier signal and provision for low temperature operation;

FIGURE 19 is a partially schematic diagram of tunable amplifier apparatus utilizing a gaseous constant loss medium.

Figure 1:
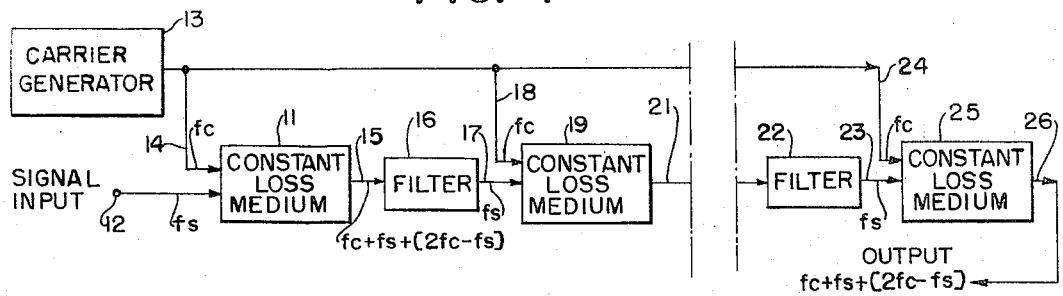
FIGURE 1 is a schematic block diagram of amplifier apparatus according to the present invention and useful in explaining the method of amplification.

Referring now to FIGURE 1, typical apparatus is shown in schematic form for practice of the present invention. A constant loss medium 11 is provided with an input signal having a nominal frequency $f_s$ from a signal input terminal 12. Throughout this discussion, the input signal will be spoken of as having a particular frequency, but it will be appreciated that the input signal may equally well be a modulated signal having numerous frequency components within a predetermined frequency band, and that it may be amplitude-modulated, pulse-modulated, frequency-modulated, or modulated in some other fashion.

The constant loss medium 11 is characterized by the fact that it absorbs impinging energy up to a predetermined saturation value in proportion to the energy applied, but thereafter is substantially unaffected by further increases in impinging energy, so that above the saturation value there is substantially a "constant loss" of power passing through the medium.

Let it suffice for the moment to say that such constant loss media are available; various forms which they may take will later be more fully explained.

The constant loss medium 11 is also supplied with a carrier signal from carirer generator 13 through a transmission path 14. The carrier signal has a frequency $f_c$ which is different from that of the input signal $f_s$. The constant loss medium 11 will typically have the described constant loss characteristics for a limited range of frequencies, and it will be assumed that such range of frequencies includes $f_s$ and is centered about $f_c$.

The term "carrier" applied to the signal from generator 13 and used throughout the description and claims is used in a general and not its highly technical sense. That is, the carrier signal here may be a locally generated signal of nearly the same frequency as the information signal, and is a "carrier" by virtue of its combination with the lower amplitude information signal.

The total power emerging from the constant loss medium 11 will obviously be less than that introduced by virtue of the carrier signal and the input signal. It will later be shown that the output from constant loss medium 11 will have three principal frequency components, $f_s$, $f_c$, and $2f_c-f_s$, the latter being displaced in frequency from the carrier signal by an amount equal to, but in a direction opposite to, that of the input signal.

Were the constant loss medium 11 merely a conventional linear absorber, the frequency components in the output would be the same as in the input, but equally diminished in magnitude. Conventional non-linear media would result in a "mixing" phenomenon producing different frequency components, but the magnitude of the frequency components $f_s$ would be less than in the input to the conventional non-linear medium. The constant loss medium having the characteristics previously described has the unexpected capability of producing an increase in the magnitude of the $f_s$ frequency component. It is principally the appreciation and application of this capability which has made the present invention possible.

As will later be explained, the gain from a single amplifier stage according to the present invention is modest, and it is therefore desirable that a multi-stage amplifier be provided, as illustrated in FIGURE 1.

Accordingly, the output from constant loss medium 11 is supplied through a suitable transmission path 15 to a filter 16 which substantially eliminates the frequency components other than the signal input frequency. The output from filter 16 is supplied through a suitable transmission path 17 to a second constant loss medium 19. Constant loss medium 19 is also supplied with a carrier signal from carrier generator 13 through a suitable transmission path 18. Another similar amplification of the signal input is accomplished through the property of the constant loss medium 19.

The signal emerging from the constant loss medium 19 through the transmission path 21 will again have a diminished overall amplitude with respect to its combined inputs, but the input signal component frequency will be amplified.

As many additional stages of amplification may be provided as desired, and in FIGURE 1 the last stage is illustrated as comprising a filter 22 connected by transmission path 23 to constant loss medium 25, which is also supplied with the carrier signal through transmission path 24. The output from constant loss medium 25 through transmission path 26 contains an input signal frequency component which has been successfully amplified in the preceding stages. The output also contains the carrier signal frequency and what may be termed the image of the input signal frequency. As will be later seen, the output is, for practical purposes, the carrier signal amplitude-modulated by the input signal. The input signal component can be separated by filtering from the outward signal or in some cases it may be desired to have the input signal present as a modulation on the carrier signal as it appears directly from the output of the last constant loss medium element 25. It will be noted that detection of the output from the apparatus of FIGURE 1 in an envelope type detector element will result in production of the difference frequency between the signal input and the carrier signal. This procedure may be useful in a heterodyne stage in electromagnetic receiving apparatus.

The filters 16 and 22 in FIG. 1 are provided to eliminate all frequency components except $f_s$ in order that successive stages operate in substantially identical fashion. In some cases the carrier and image frequencies may be tolerable or desirable in the input to successive stages and the filters may be omitted.

Figure 2:
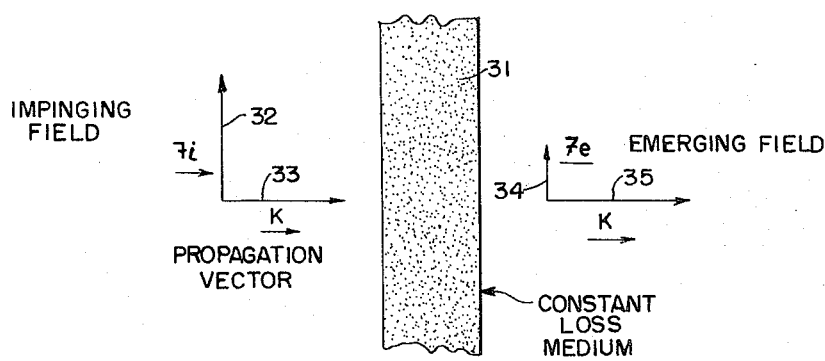
FIGURE 2 is a graphic representation of the propagation of an electromagnetic field through a constant loss medium, illustrated as a solid-state material.

A simple example of the propagation in constant loss media for use in apparatus such as illustrated in FIGURE 1, is shown in FIGURE 2.

In FIGURE 2 the constant loss medium 31 is illustrated as a body of solid material. This material may be a paramagnetic solid having an electron spin transition giving a resonant absorption in a desired convenient frequency range. An example of such a material is $Cr^{3+}$ or $Fe^{3+}$ ions in rutile ($TiO_2$). Zero field resonances of the paramagnetic materials described above provide appropriate properties for a constant loss medium. In particular, $Fe^{3+}$ ions in rutile has transitions at 43 kmc. and at 81 kmc. This is a microwave frequency range (particularly 81 kmc.) which is of practical interest but for which practical low-noise amplifying apparatus has not heretofore been perfected.

FIGURE 2 shows pictorially the propagation and field relations in the constant loss amplification process. At microwave frequencies the propagating field will usually be confined in a waveguide or other transmission line which will also contain the constant loss medium. It will be noted from FIGURE 2 that the field is propagated from left to right through the constant loss medium as indicated by vectors 33 and 35 for the impinging and emerging field respectively. The field strength is diminished by the absorption of the constant loss medium as indicated by the relative diminution of vector 34 with respect to vector 32. While amplification in the forward mode is assumed in this explanation, backward mode amplification may be practical in some cases.

In the case of paramagnetic ions in solids, it is an oscillating magnetic field acting on the magnetic dipole moment associated with the electron spins which induces the transitions. In cases where the constant loss medium is gaseous, the oscillating electric field acting on the electric dipole moment may induce rotational transitions in gaseous molecules. Since either an electric field effect or a magnetic field effect may produce transitions leading to constant loss absorption, the term "field" will be understood to include either of these cases or in fact any phenomenon falling within the concept of a field in its broad sense.

A more detailed explanation of the theory of constant loss absorption will be presented hereinafter. It is sufficient for the present to state that certain constant loss materials exist, some of which have previously been described. The electromagnetic wave energy is absorbed by these materials in such a way that the power absorbed is approximately proportional to the average energy density below a certain power level at which the material becomes "saturated" or "power broadened." Above the saturation point the power absorption becomes substantially independent of the impinging power, thus giving to the material a "constant loss" property.

While it has been pointed out that quantum mechanical properties of certain solids, liquids and gases provide ready-made constant loss media, other physical phenomena may be utilized to produce a constant loss element for use in the constant loss amplifier according to the present invention. For example, it will be clear to those familiar with electronic design that an electronic circuit can readily be designed to have such a characteristic. The elements of such a circuit may, for example, be a variable power absorbing element, a power measuring element and a feedback or servo element to maintain the power absorbed at a constant value. It is not believed that such an assembly of conventional elements into a constant loss amplifier would provide advantages over more conventional electronic amplifiers, but this example is given to illustrate that the principle of the invention is not necessarily limited to microwave frequencies or to materials having an inherent constant loss property.

Figure 3:
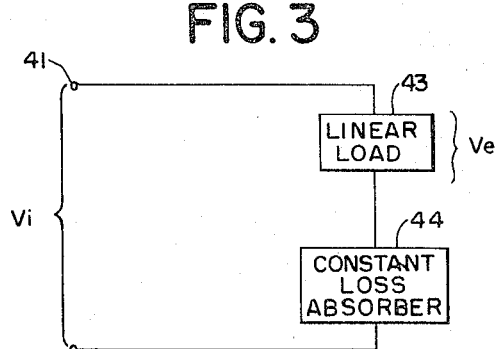
FIGURE 3 is a schematic diagram of a comparable low-frequency circuit useful in understanding the invention.

The generality of the constant loss principle of the present invention is illustrated in FIGURE 3, showing an equivalent circuit which is also useful in understanding the invention. In FIGURE 3, input terminals 41 and 42 are to be provided with both the carrier signal and the input signal which may be directly superimposed. A linear load 43 and a constant loss absorber 44 are connected in series circuit between the terminals 41 and 42. The output power is of course the power supplied to the linear load 43 and from the same consideration discussed with respect to FIGURE 1, and to be later more fully explained, the signal frequency power supplied to the linear load 43 will be amplified by virtue of the operation of the constant loss absorber 44.

It may be noted that in the various constant loss amplification devices, the device is supplied with both carrier signal and input signal concurrently and has no way of inherently distinguishing these two. It should therefore be explained that the operation of the apparatus depends upon the carrier signal being substantially greater in amplitude than the input signal and the operation of the apparatus intrinsically diminishes the power of the former and increases the power of the latter.

The demonstration of the practicality and proof of the operability of applicant's apparatus is the actual experimental testing of such apparatus, and the various theories of operation herein presented are not relied upon to prove the operability of the device nor are they intended to limit the scope of the invention. It is necessary nevertheless to present in some detail the theory of operation of the invention as it is presently known and believed by the inventor to be correct, since the operation of the apparatus and method are not particularly obvious or apparent from a description of the apparatus itself.

The invention will first be explained in a completely non-rigorous fashion in order that an intuitive idea of the operation may be imparted after which a more rigorous explanation of the theory and various design considerations will be presented.

OPERATION OF THE APPARATUS

Figure 4:
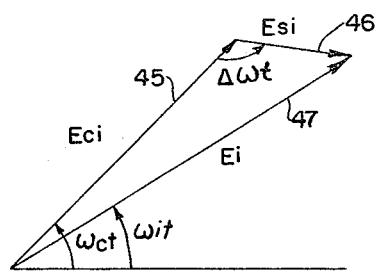
FIGURE 4 is a vector diagram useful in explaining the operation of apparatus according to the invention.

It has been seen from FIGURE 1, that the input signal is supplied together with a carrier signal to a constant loss medium in carrying out the present invention. The carrier signal is of relatively large amplitude compared to the input signal. The carrier signal is of a somewhat different frequency from the input signal, the difference being non-critical within the limits of the resonance frequency range of the constant loss medium. FIGURE 4 illustrates in vector form the various fields applied to the constant loss medium. Assuming, as will be the usual case, that the signals are directly superimposed or added, $E_{ci}$ indicated by vector 45 represents in the input carrier field. $E_{si}$ represented by vector 46 is the input signal field. The sum of these is represented by vector 47 and will be denominated $E_i$. The angular frequencies shown in FIGURE 4 are $\omega_c t$ which is the carrier angular frequency, $\omega_i t$ which is the input angular frequency and $\Delta\omega t$ which is the difference between the signal frequency and the carrier frequency. By simply applying the trigonometric formula for the third side of a triangle given two sides and the included angle, it can be shown that the combined input signal and carrier signal having different frequencies will produce a waveform having an envelope varying sinusoidally at the difference frequency. (See, "Radio Engineering," by Terman, published 1947, by McGraw-Hill, page 526.) This can also be appreciated by reference to FIGURES 6a, 6b and 6c showing the signal input waveform in FIGURE 6a the carrier signal input waveform in 6b and the waveform resulting from their superposition in FIGURE 6c. The waveforms in 6a through 6c are not intended to be to scale in either amplitude or frequency.

We have thus seen that the combined carrier signal and input signal supplied to the constant loss medium has a short term average power which varies sinusoidally at the angular frequency $\Delta\omega$. The constant loss medium should have and will be assumed to have a response to variations in power which is sufficiently rapid to respond to the different frequency but obviously does not respond to the instantaneous amplitude or power of the carrier frequency or signal frequency.

As previously explained, the constant loss medium has the effect of absorbing a predetermined amount of power from the impinging field substantially independent of the magnitude of the field (in this part of the discussion it is assumed that sufficient carrier signal power is available at all times to saturate the constant loss medium). As a result the same amount of power is subtracted from the peaks as is subtracted from the troughs of the envelope of the input signal in passing through the constant loss medium. Subtracting the same amount of power (which is proportional to the square of the field amplitude) from the peaks and the troughs causes an absolute increase in the difference between the peak amplitude and the trough amplitude of the output signal compared to such difference in the input. This is irrespective of the fact that the long term average amplitude of the output signal will be diminished with respect to the input signal; this fact is not entirely obvious but may readily be shown by the following simple algebraic manipulation.

Referring to FIGS. 6d and 6e, $\overline{E}$ represents short term average of peak amplitude; subscripts $i$ and $e$ represent input and output; max. and min. represent maximum and minimum. Power absorbed from the waveform peaks and troughs is equal and $$\overline{E}_i^2{}_{max.} - \overline{E}_i^2{}_{min.} = \overline{E}_e^2{}_{max.} - \overline{E}_e^2{}_{min.} \quad (1)$$

factoring:

$$(\overline{E}_{i\,max.} - \overline{E}_{i\,min.})(\overline{E}_{i\,max.} + \overline{E}_{i\,min.}) = (\overline{E}_{e\,max.} - \overline{E}_{e\,min.})(\overline{E}_{e\,max.} + \overline{E}_{e\,min.}) \quad (2)$$

but:

$$\overline{E}_{i\,max.} + \overline{E}_{i\,min.} = 2\overline{E}_{i\,ave.} \quad (3)$$

and $$\overline{E}_{e\,max.} + \overline{E}_{e\,min.} = 2\overline{E}_{e\,ave.} \quad (4)$$

Substituting 3 and 4 in 2:

$$(\overline{E}_{e\,max.} - \overline{E}_{e\,min.}) = \frac{\overline{E}_{i\,ave.}}{\overline{E}_{e\,ave.}}(\overline{E}_{i\,max.} - \overline{E}_{i\,min.}) \quad (5)$$

The exact significance of this increase in the amplitude difference of peaks and troughs in the output signal will be more fully explained hereinafter but it should be noted here that this amplitude difference ($\overline{E}_{e\,max.} - \overline{E}_{e\,min.}$) is a measure of the amplitude of the frequency-component of the total signal corresponding to the input signal, and the increase factor, $\overline{E}_{i\,ave.}/\overline{E}_{e\,ave.}$, represents amplification of the input signal.

An intuitive understanding of the invention is sometimes aided by the specific example and the following example is presented to illustrate amplification by constant loss absorption. In this example one should keep in mind that $\overline{E}_{max.} - \overline{E}_{min.}$ is a measure of the signal amplitude in either input or output.

Let:

$$\overline{E}_{i\,max.} = 101 \quad (6)$$

$$\overline{E}_{i\,min.} = 100 \quad (7)$$

$$\overline{E}_{i\,max.} - \overline{E}_{i\,min.} = 1 \quad (8)$$

$$\overline{E}_i^2{}_{max.} - \overline{E}_i^2{}_{min.} = 10201 - 10000 = 201 \quad (9)$$

Let:

$$\overline{E}_{e\,min.} = 10 \quad (10)$$

$$\overline{E}_e^2{}_{min.} = 100 \quad (11)$$

For constant loss:

$$\overline{E}_e^2{}_{max.} - \overline{E}_e^2{}_{min.} = 201 \quad (12)$$

$$\overline{E}_e^2{}_{max.} = 201 + 100 = 301 \quad (13)$$

$$\overline{E}_e^2{}_{max.} = \sqrt{301} = 17.35 \quad (14)$$

$$\overline{E}_{e\,max.} - \overline{E}_{e\,min.} = 7.35 = 7.35(\overline{E}_{i\,max.} - \overline{E}_{i\,min.}) \quad (15)$$

Thus far only the envelope of the output signal has been discussed. For the purposes of this greatly simplified explanation, it will be reasonable to assume that the principal effect of the constant loss material will be to impart a relatively deep modulation to the output signal and that otherwise the output signal will predominantly comprise the carrier signal since this was the predominant input to the constant loss medium. This rather inexact analysis has therefore indicated that the output from the constant loss medium will be a signal at the carrier frequency, amplitude-modulated at a frequency equal to the difference between the carrier frequency and the input signal frequency. The depth of this amplitude modulation of the output under favorable circumstances may be increased to be several times greater than the variation in amplitude of the envelope of the combined carrier signal and input signal originally supplied to the constant loss medium. It is well known that a wave with sine wave-amplitude modulation consists of three frequencies, namely, the carrier frequency and two side bands of equal amplitude and equally displaced from the carrier frequency by an amount equal to the modulation frequency. It is further well known that the amplitude of the side band frequency components increases in direct proportion to the degree of modulation (frequently referred to as the modulation factor). Thus, it may be appreciated that by increasing the depth or degree of modulation, the constant loss medium actually increases the input signal frequency component thereby providing positive gain. It will be noted that in addition to the output at the input signal frequency there is another side band displaced in the opposite direction frequency-wise from the carrier frequency which would also carry any information originally carried by the input signal by virtue of modulation thereof.

The previously explained operation of the constant loss amplifier is graphically depicted in the spectrum diagrams of FIGURES 5a and 5b.

In FIGURES 5a and 5b the frequency is represented on the horizontal axis and the square of the amplitude of the field is represented on the vertical axis. The square of the field is proportional to the power.

In FIGURE 5a, it will be noted that the input carrier power $E^2_{ci}$ represented by vertical line 51 is substantially greater than the input signal power $E^2_{si}$ represented by vertical line 52. Both the carier input frequency and the signal input frequency are within the response of the resonant medium indicated by dashed line 53, and the carrier frequency is located approximately at the center of the response curve. The operation of the constant loss amplifiers is not limited to this particular placement of frequencies within the response of the resonant medium; the principal requirement is that the carrier frequency be within the response of the resonant medium (but not necessarily at the center of it). It will be noted from FIGURE 5a that the difference in angular frequencies between the carrier signal and the input signal is defined as $\Delta\omega$.

FIGURE 5b illustrates the principal output signals from the constant loss medium corresponding to the inputs illustrated in FIGURE 5a. The carrier signal will normally be the predominant output signal as illustrated by vertical line 56 and will be unchanged in frequency and thus be in the center of the response curve 57 for the resonant medium. The input signal appears in the output as two components indicated at 54 and 55. The first of these may be termed the emergent information signal and is labeled $E^2_{se}$. The other signal may be termed the emergent image signal or the emergent reflected signal and is labeled $E^2_{re}$.

From the foregoing explanation it will be seen that a constant loss medium has the unexpected property of providing amplification of a relatively small amplitude input signal at the expense of a larger amplitude carrier signal when the two are superimposed and propagated through the medium.

The previous simplified explanation, is not intended to be an exact one and a more complete mathematical explanation will also be presented which will be more accurate and better adapted to aid in formulating the design of apparatus according to the present invention.

AMPLIFIER APPARATUS

While the physical configuration of apparatus according to the invention may take various forms, it may be useful to present examples of suitable configurations; one such is illustrated in FIGURE 7. The constant loss amplifier 71 of FIGURE 7 is shown for use with a gaseous constant loss medium, although it could readily be adapted to a solid medium.

The amplifier of FIGURE 7 is intended for use at microwave radio frequencies and accordingly waveguide transmission lines are provided for propagation of the signals. Waveguide 72 contains the constant loss gaseous medium which may be any one of a number of gaseous substances which will later be described. The waveguide 72 will be designed in accordance with standard techniques for the frequency of operation which will in turn be determined by the frequency corresponding to energy level transitions of the particular gaseous medium which is to be used. The input 73 to the waveguide 72 is a waveguide section which may be air-filled and a radiation-transparent window 74 is provided to seal the constant loss medium within the waveguide 72 at the input end.

Another window 76 is provided at the output end of the waveguide 72 and an output waveguide 77 is provided for the amplified output signal.

Carrier signal power is provided through a carrier signal input 79 to a waveguide 78 which is parallel to the constant loss medium-filled waveguide 72. Windows 81 are provided from waveguide 78 into waveguide 72 which are so formed to provide directional couplers for coupling the carrier signal power into the constant loss medium without allowing any significant amount of the signal transmitted through waveguide 72 to escape into carrier signal waveguide 78. The construction of such directional couplers is well known and has been omitted from FIGURE 7 for simplicity.

It will be seen therefore that the apparatus of FIGURE 7 represents a multistage amplifier wherein the input signal is combined with the carrier signal at the extreme lefthand window 81 and the input signal is amplified in passing through waveguide 72 by virtue of the characteristic of the constant loss medium. Additional carrier input signal is superimposed on this amplified input signal at the second window 81 and further successive amplification operations are produced until the substantially amplified input signal reaches the amplifier signal output 77. Absorbing material 82 may be provided in the end of waveguide 78 to absorb any carrier power not transmitted into waveguide 72 and to prevent unwanted reflections.

In order to provide more detailed information with regard to aid in the design of a constant loss amplifier of the gaseous type as schematically illustrated in FIGURE 7, it is desirable to consider the operation of constant loss amplifiers on a more analytical basis.

MATHEMATICAL ANALYSIS OF CONSTANT LOSS AMPLIFICATION

This section will consider the effect of "constant" average power absorption on the Fourier components of a particular assumed oscillating field. For concreteness and simplicity, imagine an electromagnetic wave passing normally through a slab of absorbing medium (gas, liquid or solid), as in FIGURE 2. This idealized situation does not differ much from the practical radio frequency apparatus comprising a waveguide section filled with absorber illustrated in FIGURE 7. The same result would obtain in a low-frequency case with a constant loss circuit element as in FIGURE 3.

Let the impinging electric or magnetic field be given by $$F_i = \text{real } E_i = \text{real}[E_i e^{i\omega_i t}] = \text{real}[E_{ci} e^{i\omega_c t} + E_{si} e^{i\omega_s t}] =$$
$$E_{ci} \cos \omega_c t + E_{si} \cos \omega_s t \quad (16)$$

where $\omega_c$, $\omega_s$ are constant angular frequencies.

$$\Delta \omega = \omega_s - \omega_c \ll \omega_c$$

$E_{si} \ll E_{ci}$ are constant real positive amplitudes. Assume that the directions of the fields $E_c$ and $E_s$ are parallel in space and need not be added vectorially. Any initial phase difference between $E_{ci}$ and $E_{si}$ is of no consequence.

The complex field is shown in FIGURE 4. $E_i$, $\omega_i$ are slowly varying real positive functions of the time. If all the Fourier components fall within a certain angular frequency bandwidth greater than $\Delta \omega$, we shall assume that the effect of the absorber on the total field of the wave passing through is given by the following two statements:

(a) The squared amplitude of the field, $E_i^2$ is reduced by a constant amount, $E_L^2$. That is, $E_e^2 = E_i^2 - E_L^2$.

(b) The phase of the emerging wave is the same as it would be in the absence of the absorber. That is, if $$E_i = E_i e^{i\omega_i t}, \text{ then } E_e = E_e e^{i\omega_i (t - \Delta t)} \quad (17)$$

where $\Delta t$ is the constant transit time.

Equations 17 determine the emergent field.

The square of the instantaneous impinging field magnitude is given by $$F_i^2 = E_{ci}^2 \cos^2 \omega_c t + E_{si} E_{ci} \{\cos (\omega_s + \omega_c) t + \cos (\omega_s - \omega_c) t\} + E_{si}^2 \cos^2 \omega_s t \quad (18)$$

When averaged over a time, $\tau$, such that $$\frac{2\pi}{\omega} \ll \tau \ll \frac{2\pi}{\Delta \omega}$$

$$2\overline{F_i^2} = E_i^* E_i = E_{ci}^2 + 2 E_{si} E_{ci} \cos (\Delta \omega t) + E_{si}^2 \quad (19)$$

It is this quantity which is reduced by a constant loss term:

$$2\overline{F_{exit}^2} = 2\overline{F_i^2} - E_L^2 = E_i^* E_i - E_L^2$$
$$= E_{ci}^2 + 2 E_{si} E_{ci} \cos (\Delta \omega t) + E_{si}^2 - E_L^2 \quad (20)$$

The slowly varying cross-term remains unchanged. The emergent field must contain Fourier components which give the same fluctuating term:

$$2\overline{F_{exit}^2} = E_{ce}^2 + 2 E_{se} E_{ce} \cos \Delta \omega_c^1 + E_{se}^2 \quad (21)$$

Where $$E_{si} E_{ci} = E_{se} E_{ce}$$

and $t' = t - \Delta t$ (hereafter the prime is dropped).

The only way this can occur is that the signal power be increased while the carrier power is being necessarily decreased. If we neglect the small term, $E_s^2 \ll E_c^2$, then, comparing Equations 20 and 21 we see that $$E_{ce} \equiv \sqrt{\frac{E_{ci}^2 - E_L^2}{E_{ci}^2}} E_{ci} \equiv \frac{1}{g} E_{ci} \quad (22)$$

and
$$E_{se} = g E_{si}$$

where $1/g^2$ = the average power loss factor. Actually, the amplified signal power is divided principally into two side bands. These Fourier components, in the lowest power of $E_s$, are obtained from a series expansion below.

According to Equations 17 the impinging and emerging fields may be written:

$$F_i = \text{real } E_i = \text{real}\{E_i e^{i\omega_i t}\}$$

$$= \text{real}\left\{\sqrt{E_i^* E_i} \frac{E_i}{\sqrt{E_i^* E_i}}\right\}$$

$$F_e = \text{real}\left\{\sqrt{E_i^* E_i - E_L^2} \frac{E_i}{\sqrt{E_i^* E_i}}\right\} \quad (23)$$

where $$\frac{E}{\sqrt{E_i^* E_i}} = e^{i\omega t}$$

is the unchanged phase factor.

To first order in $E_{si} \ll \sqrt{E_{ci}^2 - E_L^2}$ $$\epsilon_{exit} = \frac{\sqrt{(E_c^2 - E_L^2) + E_c E_s (e^{i\Delta\omega\tau} + e^{-i\Delta\omega\tau})}}{\sqrt{E_c^2 + E_c E_s (e^{i\Delta\omega\tau} + e^{-i\Delta\omega\tau})}} \{\epsilon_i = E_c e^{i\omega_c\tau} + E_s e^{i(\omega_c + \Delta\omega)\tau}\} \quad (24)$$

$$\epsilon_{exit} = \sqrt{\frac{E_c^2 - E_L^2}{E_c^2}} \left\{1 + \left[\frac{1}{E_c^2 - E_L^2} - \frac{1}{E_c^2}\right]\frac{E_c E_s}{2}(e^{i\Delta\omega\tau} + e^{-i\Delta\omega\tau}) - \cdots\right\} \epsilon_i \quad (25)$$

$$\epsilon_{exit} = \sqrt{\frac{E_c^2 - E_L^2}{E_c^2}} E_c e^{i\omega_c\tau}$$

$$+ \sqrt{\frac{E_c^2 - E_L^2}{E_c^2}} \left\{1 + \frac{1}{2}\frac{E_L^2}{E_c^2 - E_L^2}\right\} E_s e^{i(\omega_c + \Delta\omega)\tau}$$

$$+ \sqrt{\frac{E_c^2 - E_L^2}{E_c^2}} \left\{\frac{1}{2}\frac{E_L^2}{E_c^2 - E_L^2}\right\} E_s e^{i(\omega_c - \Delta\omega)\tau} \quad (26)$$

Assuming that $$g^2 \cong \frac{E_c^2}{E_{ci}^2 - E_L^2} \cong \frac{E_L^2}{E_{ci}^2 - E_L^2} \gg 1,$$

$$\epsilon_{exit} = \frac{1}{g} E_c e^{i\omega_c t} + \frac{g}{2} E_s \{e^{i(\omega_c + \Delta\omega)t} + e^{i(\omega_c - \Delta\omega)t}\} \quad (27)$$

$$= \left\{\frac{1}{g} E_c + g E_s \cos \Delta\omega\tau\right\} e^{i\omega_c t} \quad (28)$$

Thus it has been analytically shown that the output spectrum consists of the carrier field amplitude-modulated at the difference frequency. The frequency components are shown in FIGURES 5a and 5b.

Since $$2F_e^2 = E_e^* E_e = \frac{1}{g^2} E_{ci}^2 = 2E_{si} E_{ci} \cos \Delta\omega t + \frac{g^2}{2} E_{si}^2 \quad (29)$$

when averaged over time, $\tau$, such that $$\frac{2\pi}{\omega} < \tau < \frac{2\pi}{\Delta\omega}$$

and $$\overline{2F_e^2} = \overline{E_e^* E_e} \cong \frac{1}{g^2} E_{ci}^2 + \frac{g^2}{2} E_{si}^2 \quad (30)$$

when averaged over time, $$\tau' > \frac{2\pi}{\Delta\omega}$$

it is evident that the modulation power is greater than the input signal power by the factor $g^2/2$. Compared to a case where the original signal is required to be heterodyned, the power gain in the detected difference frequency is $g^2$, since the same factor of ½ power is lost in any heterodyning process.

From the foregoing mathematical analysis it is possible for one skilled in the art to proceed with the design of constant loss amplifier apparatus utilizing values of attenuation constants for gaseous and solid materials at frequencies corresponding to strongly absorbing transitions, many such values being available in published literature. Certain suitable constant loss media and their attenuation constants are tabulated hereinafter (Table I).

The various design considerations are for the most part obvious ones but for further clarity they may be summarized as follows:

The carrier frequency may be at the center of the resonant response of the constant loss medium unless in the particular application a desirable result is obtained by a different relation between carrier frequency and resonant response frequency. The signal frequency should be displaced either above or below the carrier frequency and preferably within the resonant response frequency range of the constant loss medium.

Where the constant loss medium is placed within a transmission line, the transmission line should obviously be designed to propagate both the carrier frequency and the signal frequency, preferably with relatively little attenuation (such as wall losses in waveguide). It should be noted that there is no requirement for harmonic relationship or the like between the carrier frequency and the signal frequency (as there is in the case of parametric amplifiers) and thus the carrier frequency and signal frequency can be relatively close together thereby greatly simplifying the task of designing transmission line to propagate the two signals.

The carrier power preferably should be sufficient to saturate the constant loss medium throughout the active volume of the constant loss medium. The path length of the signals through the constant loss medium should be sufficiently long to provide an absorption factor sufficient to provide the desired net gain per stage, see Equation 22. If the velocity of propagation is reduced by a slow wave structure, dielectric constant of absorber, or otherwise, this also serves to increase the absorption factor and may thus reduce the length of transmission line required.

In the usual case several stages of amplification either in separate devices or in the same device will be desirable and obviously the number of stages necessary to provide the desired total gain should be provided.

Table I gives a list of suitable constant loss gaseous media having strongly absorbing transitions.

A brief discussion of gaseous constant loss media generally will be helpful to an understanding of the apparatus of the invention and the operation thereof.

As regards gaseous constant loss media, it will be appreciated that a high absorption coefficient is desirable in order to reduce the required length of medium through which the electromagnetic energy must be propagated.

Another desired characteristic is that the medium be capable of power broadening. This enhances the frequency response characteristics of the constant loss medium.

Both of the above desirable features are generally present in gases with molecules having high electric dipole moment. Molecules which may be mentioned in this regard are the halide salts, TlCl, and HCN.

In order that there be a high absorption coefficient associated with a particular gas, it is desirable that the molecule be one with an abnormally low number of states at low temperatures, and preferably degenerate.

A first group of molecules having desirable properties, particularly with regard to a low number of states, is the linear molecules. It will be appreciated that a lower number of states may be expected in this group due to the lack of a degree of rotational freedom in the linear molecules. A primary example of such linear molecules is HCN.

It should be pointed out here that frequently various isotopes of an element may be selected to give respectively different transition frequencies. Thus a great deal more freedom in selection of a frequency range may be obtained than if only the most common isotopes of the elements were employed. Accordingly, in this discussion where isotope numbers of the elements are not specified, it may be understood that various isotopes of the elements comprising a molecule may be selected in varying combinations to provide different frequencies of transition. It should also be pointed out that HCN is light, and of the vibrational energies, none but the lowest is appreciably occupied at room temperature or below.

A specific member of this first group, HCN[15] has the additional advantage that all spins are zero or one-half and there is no quadruple splitting. The number of states is therefore correspondingly less.

It has previously been mentioned that uncommon isotopes of elements may be utilized to give the molecules different transition frequencies, but it should be particularly pointed out that the substitution of deuterium for hydrogen is particularly useful in this regard. Thus DCN may be utilized with the same advantages as HCN but will be found to have a different transition frequency.

Other linear molecules may be used for special advantages, for example HCCCN or IBr. These molecules have closely spaced rotational transitions for use in untuned broad band amplification.

In addition to the group of linear molecules there is a second group of molecules having desirable constant loss properties. These are the symmetric top molecules which are readily electrically tunable by virtue of their linear Stark shift as compared with a quadradic Stark shift in the case of unsymmetric molecules.

Examples of symmetric top molecules are $CH_3F$ (methyl flouride) and $NH_3$ (ammonia). These two molecules have the added advantage that the off-axis (hydrogen) atoms are light with the result that there are fewer rotational states and each state accordingly has a higher population; higher absorption coefficients are therefore provided by the two above identified molecules.

The above described advantages of symmetric top molecules may also be found in almost-symmetric top molecules such as $H_2Cl$ or $LiNH_2$. At high electric fields these molecules have an approximately linear Stark shift and provide a medium for a tunable amplifier although the range of tuning may be somewhat less than with the symmetric top molecules.

A third group of molecules are asymmetric top molecules with special characteristics such as $H_2O$, HDO, and $D_2O$. Even though this third group does not have symmetric top molecules, it will be noted that all but one of the molecules is light and thus a good absorption coefficient will be provided.

A fourth group of molecules are paramagnetic molecules which may be tuned by the Zeeman effect (rather than the Stark effect). An example of such molecules is $IrF_6$. It will be noted in this molecule that the Ir atom is shielded from collision by the F atoms and there is no effective orbital magnetic moment of the Ir atom.

It will be appreciated from the foregoing discussion of gaseous constant loss media and from the extensive table of such media that many constant loss media are available from which an appropriate gas generally may be selected to have an appropriate frequency, frequency range, and/or tunability for a particular use.

TABLE I.—STRONGLY ABSORBING TRANSITIONS IN MOLECULAR GASES

[6 mm.>λ>1 mm.]

| Molecule | Frequency (Mc./sec.) | Terminal States of Transition | | Electric Dipole Moment, $\mu_D$ in Debye ($10^{-18}$esu) | Bandwidth at 1 mm. Hg. Pressure (Mc./sec./mm. Hg.) | Absorption coeff. αlinear in cm.$^{-1}$ |
|---|---|---|---|---|---|---|
| | | J', K'$_{-1}$, K'$_{+1}$ | J'', K''$_{-1}$, K''$_{+1}$ | | | |
| $C^{12}D_3C^{12}N^{14}$ | 47,150 | 3 | 2 | 3.8 | 25 | $10^{-3}$ |
| $C^{12}S^{32}$ (unstable τ≲5 min.) | 49,170 | 1 | 0 | 2.0 | 15 | $10^{-3}$ |
| $C^{12}D_3N^{14}C^{13}$ | 49,670 | 3 | 2 | 3.8 | 25 | $10^{-3}$ |
| $HDO^{16}$ | 50,240 | 3, 2, 1 | 3, 2, 2 | 1.8 | 4 | 0.0016 |
| $C^{12}D_3N^{14}C^{12}$ | 51,490 | 3 | 2 | 3.8 | 25 | 0.0014 |
| $C^{12}H_3C^{12}N^{15}$ | 53,530 | 3 | 2 | 3.9 | 25 | 0.0023 |
| $C^{13}H_3C^{12}N^{14}$ | 53,600 | 3 | 2 | 3.9 | 25 | 0.0023 |
| $C^{12}H_3C^{13}N^{14}$ | 55,165 | 3 | 2 | 3.9 | 25 | 0.0023 |
| $C^{12}H_3C^{12}N^{14}$ | 55,190 | 3 | 2 | 3.9 | 25 | 0.0023 |
| $C^{12}H_3N^{14}C^{13}$ | 58,175 | 3 | 2 | 3.8 | 25 | 0.003 |
| $C^{12}H_3N^{14}C^{12}$ | 60,320 | 3 | 2 | 3.8 | 25 | 0.003 |
| $Cl^{37}F$ | 60,760 | 2 | 1 | 0.88 | 10 | 0.001 |
| $Cl^{35}F$ | 61,940 | 2 | 1 | 0.88 | 10 | 0.001 |
| $DC^{13}N^{14}$ | 71,175 | 1 | 0 | 3.0 | 25 | 0.0071 |
| $DC^{12}N^{14}$ | 72,415 | 1 | 0 | 3.0 | 25 | 0.0075 |
| $H_2C^{12}O^{16}$ | 72,840 | 1, 0, 1 | 0, 0, 0 | 2.3 | 10 | 0.001 |
| $C^{13}H_3Cl^{37}$ | 75,540 | 3 | 2 | 1.87 | 15 | 0.0024 |
| $C^{13}H_3Cl^{35}$ | 76,780 | 3 | 2 | 1.87 | 15 | 0.0024 |
| $C^{12}H_3Cl^{37}$ | 78,520 | 3 | 2 | 1.87 | 15 | 0.0024 |
| $C^{12}H_3Cl^{35}$ | 79,755 | 3 | 2 | 1.87 | 15 | 0.0024 |
| $HDO^{16}$ | 80,580 | 1, 1, 0 | 1, 1, 1 | 1.8 | 4 | 0.005 |
| $HC^{13}N^{14}$ | 86,340 | 1 | 0 | 3.0 | 25 | 0.013 |
| $HC^{12}N^{14}$ | 88,630 | 1 | 0 | 3.0 | 25 | 0.0137 |
| $Cl^{37}F$ | 91,140 | 3 | 2 | 0.88 | 10 | 0.0033 |
| $Cl^{35}F$ | 92,910 | 3 | 2 | 0.88 | 10 | 0.0033 |
| $C^{12}S^{32}$ (unstable τ≲5 min.) | 98,340 | 2 | 1 | 2.0 | 15 | 0.008 |
| $C^{12}H_3F$ | 102,140 | 2 | 1 | 1.8 | 20 | 0.003 |
| $HDO^{16}$ | 120,800 | 5, 1, 5 | 4, 2, 2 | 1.8 | 4 | 0.0033 |
| $C^{12}D_3F$ | 122,700 | 3 | 2 | 1.8 | 20 | 0.005 |
| $HDO^{16}$ | 138,500 | 6, 1, 6 | 5, 2, 3 | 1.8 | 4 | 0.0023 |
| $DC^{13}N^{14}$ | 142,350 | 2 | 1 | 3.0 | 25 | 0.058 |
| $HDO^{16}$ | 143,700 | 4, 2, 2 | 4, 2, 3 | 1.8 | 4 | 0.007 |
| $DC^{12}N^{14}$ | 144,830 | 2 | 1 | 3.0 | 25 | 0.06 |
| $C^{12}S^{32}$ (unstable τ≲5 min.) | 147,500 | 3 | 2 | 2.0 | 15 | 0.027 |
| $3^{12}H_3F$ | 153,200 | 3 | 2 | 1.8 | 20 | 0.014 |
| $H_2S^{34}$ | 167,900 | 1, 1, 1 | 1, 0, 1 | 1.0 | 4 | 0.058 |
| $H_2S^{33}$ | 168,300 | 1, 1, 1 | 1, 0, 1 | 1.0 | 4 | 0.058 |
| $H_2S^{32}$ | 168,800 | 1, 1, 1 | 1, 0, 1 | 1.0 | 4 | 0.058 |
| TBr | 172,400 | | | 3.0 | 25 | 0.10 |
| $HC^{13}N^{14}$ | 172,700 | 2 | 1 | 3.0 | 25 | 0.11 |
| $HC^{12}N^{14}$ | 177,300 | 2 | 1 | 3.0 | 25 | 0.0068 |
| $H_2O^{16}$ | 184,500 | 3, 1, 3 | 2, 2, 0 | 1.9 | 4 | 0.0073 |
| DI | 195,100 | 1 | 0 | 0.38 | 8 | 0.19 |
| $DC^{13}N^{14}$ | 213,500 | 3 | 2 | 3.0 | 25 | 0.038 |
| $H_2S^{32}$ | 216,700 | 2, 2, 0 | 2, 1, 1 | 1.0 | 4 | 0.20 |
| $DC^{12}N^{14}$ | 217,200 | 3 | 2 | 3.0 | 25 | |
| TCl | 220,600 | | | | | high |
| $HDO^{16}$ | 241,600 | 2, 1, 1 | 2, 1, 2 | 1.8 | | 0.055 |
| $DBr^{81}$ | 254,500 | 1 | 0 | 0.78 | 10 | 0.055 |
| $DBr^{79}$ | 254,700 | 1 | 0 | 0.78 | 10 | 0.35 |
| $HC^{13}N^{14}$ | 259,000 | 3 | 2 | 3.0 | 25 | 0.37 |
| $HC^{12}N^{14}$ | 265,900 | 3 | 2 | 3.0 | 25 | 0.14 |
| $DCl^{37}$ | 322,300 | 1 | 0 | 1.0 | 14 | 0.14 |
| $DCl^{35}$ | 322,300 | 1 | 0 | 1.0 | 14 | 0.0075 |
| $H_2O^{16}$ | 324,000 | 5, 1, 5 | 4, 2, 2 | 1.9 | 4 | 0.004 |
| $C^{13}O^{16}$ | 330,600 | 3 | 2 | 0.10 | 5 | 0.0045 |
| $C^{12}O^{16}$ | 345,800 | 3 | 2 | 0.10 | 5 | |

Quantum mechanics of constant loss

In the explanation thus far presented, the assumption has been made that materials having "constant loss" properties are available, without going into the quantum mechanical explanation of such characteristics. However, a discussion of such matters will be useful.

An equation describing the nonlinear absorption of electromagnetic power by molecules may be derived from quantum mechanical theory which has been experimentally verified. It is known that, in the absence of time-dependent perturbations, a molecule may possess only certain definite energies. A molecule having a particular energy is described by one or another characteristic function of the coordinates (eigenfunctions). If it is uncertain which state a molecule is in, the proper description is by a state function, $\psi$, which is a linear combination of the possible eigenfunctions:

$$\psi = \sum_n a_n \psi_n, \int \psi_n \psi_n^* dv = 1$$

$a_n a_n^*$ gives the (constant) probability that the molecule will be found in a given eigen state with the corresponding eigen energy.

If the molecule is subject to an oscillating field, the $a_n$ become time-dependent and the molecule may change states with the absorption or emission of electromagnetic energy. If the frequency corresponds to the energy difference between two states, according to Einstein's equation: $W_h - W_1 = m\gamma_0$, transitions will be induced primarily between the two states, $h$ and $l$. If the molecule is initially in state $l$, then, under the influence of an oscillating field of constant frequency and amplitude, the probability that the molecule will be found in state $h$ fluctuates with time, until suffering a relaxation collision, according to the equation:

$$a_h a_h^* = \frac{\left[\frac{\vec{\mu} \cdot \vec{E}}{\hbar}\right]^2}{[\omega - \omega_0]^2 + \left[\frac{\vec{\mu} \cdot \vec{E}}{\hbar}\right]^2} \sin^2\left\{\left[(\omega - \omega_0)^2 + \left(\frac{\vec{\mu} \cdot \vec{E}}{\hbar}\right)^2\right]^{1/2} \frac{t}{2}\right\}$$

(31)

On resonance, the equation simplifies to $$a_h a_h^* = |a_h|^2 = \sin^2\left\{\left(\frac{\vec{\mu} \cdot \vec{E}}{\hbar}\right)\frac{t}{2}\right\} \quad (32)$$

where $\vec{\mu} \equiv$ vector matrix element of the dipole moment associated with the transition. In most cases of interest, this will be electric, but may be magnetic.

$\vec{E} \equiv$ Electric (magnetic) field amplitude.

$$\frac{\omega - \omega_c}{2\pi} = \gamma - \gamma_0 \equiv$$

difference between applied and resonant frequencies.

$2\pi \hbar = h \equiv$ Planck's constant $= 6.62 \times 10^{-27}$ erg—sec.

When the molecule is definitely in a particular state ($l$ or $h$), no oscillating electric dipole exists. An electric field oscillating near the transition frequency, $\gamma_0$, will however, induce in the molecule an oscillating dipole moment, $$p = \int \psi^* \vec{\mu} \psi dV$$

of the same frequency as the impressed field. The power absorbed at resonance is then Instantaneous power per molecule $= \dot{p} \cdot \vec{\epsilon}^* \cong \omega \vec{\mu} \cdot \vec{E} \sin\left(\frac{\vec{\mu} \cdot \vec{E}}{\hbar}\right) t \sin^2 \omega t$ (33)

When averaged over a cycle,

Power per molecule $= \dfrac{\omega \vec{\mu} \cdot \vec{E}}{2} \sin\left(\dfrac{\vec{\mu} \cdot \vec{E}}{\hbar}\right) t$ (34)

which is just the time derivative of Equation 32 multiplied by the energy, $h\gamma$, of one photon. That, is the power absorbed (or emitted) is just the rate at which a photon is transferred during the transition between the two states. According to the sign of sin $$\left(\frac{\vec{\mu} \cdot \vec{E}}{\hbar}\right) t$$

the induced oscillating dipole moment is in the same or opposite phase as the impressed field. Thus a photon of electromagnetic energy is absorbed (or emitted) as the atom undergoes a transition from a lower to a higher energy state (or vice versa).

In the absence of a strong constant external field to orient the molecule in space, the polarization of the induced dipole moment and the impressed field are in the same direction. The properties described above are those of a *coherent* interaction between molecule and field.

In thermal equilibrium, the ratio of molecular populations in the upper and lower of a pair states is given by the Boltzmann equation:

$$\frac{N_h}{N_l} = e^{-\left(\frac{W_h - W_e}{KT}\right)} \quad (35)$$

Every relaxation collision will leave a molecule in some state with a probability determined by Equation 35. A non-thermal distribution of molecules among the possible states will relax to the Boltzmann distribution in a characteristic relaxation time, $\tau$, equal to a mean collision time in the case of gases.

$$\frac{1}{\tau} = N \sigma \bar{v} \quad (36)$$

where $N \equiv$ molecular density
$\sigma \equiv$ relaxation cross section
$v \equiv$ mean velocity It is generally assumed, in the case of gases, that the transverse or phase relaxation time, $T_2 = \tau = T_1$, the longitudinal or energy relaxation time. It will be so assumed here for the present.

Up to this point the description applies equally well to transitions taking place in solids, liquids or gases. However in solids generally, $T_1 \ll T_2$. This would have to be taken into account in subsequent equations. The analysis will not be extended to the solid state case for the present.

From the foregoing it is clear that only the differential population between two states can give rise to a net exchange of energy with the electromagnetic field. For the purpose of calculating the absorption of power from an electromagnetic oscillating field of constant amplitude and frequency, only the Boltzmann excess density, $N_{ex}$, of molecules in the lower of a pair of states need be considered. These molecules undergo transitions according to Equations 31 until suffering a collision. The average effect of all collisions is to return each molecule in the Boltzmann excess to the lower state. Then a photon will have been irreversibly absorbed and converted to heat with the probability, $a_h a_h^*$, that the molecule was in the upper state at the time of the collision. The time derivative of Equation 31 may be summed over an exponential distribution of collision times to obtain:

$$\frac{P_i}{V} = \text{power observation per unit volume} = \int_0^\infty \left[h\gamma N_{ex} \frac{)\cdot l^*) a a_{hh}}{dt}\right] \frac{e^{-t/\tau}}{\tau} dt$$

$$= \frac{h\gamma N_{ex}}{2\tau} \frac{\mu E^2}{\hbar} \frac{1}{(\omega - \omega_0)^2 + \left(\frac{1}{\tau}\right)^2 + \left(\frac{\mu E}{\hbar}\right)^2}$$

(37)

Since each molecule starts its transition at a random time, this is also the power averaged over one cycle of the impressed oscillating field.

If $$\frac{\mu E}{\hbar} \ll \frac{1}{\tau}$$

the power absorbed is proportional to $$\frac{E^2}{8\pi} \equiv \rho$$

the average energy density. This linear loss rate is similar to wall losses in a cavity in that a constant molecular quality factor, $$Q_m \equiv \frac{\omega \rho}{\text{loss rate}} \quad (38)$$
$$= \omega/\alpha$$

may be defined.

If $$(\omega - \omega_0)^2 \ll \left(\frac{1}{\tau}\right)^2 \ll \left(\frac{\mu E}{\hbar}\right)^2$$

the molecular transistion is "saturated" or "power broadened."

Then $$\frac{P_L}{V} \rightarrow \frac{\hbar \gamma N_{ex}}{2\tau} \quad (39)$$

A molecule undergoes many transitions $$\left[\eta \approx \left(\frac{\mu E}{\hbar}\right)\Big/\left(\frac{1}{\tau}\right)\right]$$

up and down between energy states before colliding and "returning to the lower state." The molecule will be in the upper state approximately ½ of the time. Hence, for only ½ of the collisions will photons have been absorbed. The power loss density will, under saturation conditions, be approximately constant, rather than proportional to the electromagnetic energy density, $\rho$. Therefore, $Q_m$ will vary with $\rho$.

The average ratio, $N_h/N_l$, never quite reaches one no matter how great is $\rho$. Therefore, there exists a residual induced oscillating dipole moment per unit volume; that is, the summation of Equation 34 over all molecules is a constant equal to Equation 39. If $\rho$ changes, the dipole moment density changes in compensation within the characteristic time, $\tau$. If $\rho$ changes at a rate, $$\left|\frac{1}{\rho}\frac{d\rho}{d\tau}\right| \ll \frac{1}{\tau} P_L/V$$

will remain nearly constant. Put in another way, the molecules have little phase or amplitude memory beyond the collision time, $\tau$. Therefore, if the Fourier components of the impressed field fall within a bandwidth $\Delta \omega = 2\tau$ centered on $\omega_0$, then a constant power loss will exist.

There will remain a residual dependence of the power loss density $P_L/V$ on the electromagnetic energy density, $$\rho = \frac{E^2}{8\pi}$$

(in Gaussian units). For the case, $$(\omega - \omega_0)^2 \ll \left(\frac{1}{\tau}\right)^2 \ll \left(\frac{\mu E}{\hbar}\right)^2$$

Equation 37 may be expanded in powers of $$\eta^2 \equiv \left(\frac{1}{\tau}\right)^2 \Big/ \left(\frac{\mu E}{\hbar}\right)^2:$$

$$\frac{P_L}{V} = \frac{N_{ex}\eta\nu}{2\tau}[1 - \eta^2 \ldots] = -c\frac{d\rho}{dz} \quad (40)$$

where $c$ is propagation velocity.

For a small change, $$\delta \rho, \rho = \left(\frac{E^2}{8\pi}\right)$$

$$\frac{P_L}{V} = -c\frac{\partial \rho}{\partial z} = \frac{N_{ex}h\nu}{2\tau}\left[1 - \eta^2\left(1 - \frac{\delta \rho}{\rho} \ldots\right)\ldots\right] \quad (41)$$

or $$\delta\left(\frac{P_L}{V}\right) = -c\frac{\partial(\delta \rho)}{\partial z} = \frac{N_{ex}h\nu}{2\tau}\frac{\eta^2}{\rho}\delta\rho \approx -\frac{c\partial\rho}{\rho \partial z}\eta^2 \delta\rho \quad (42)$$

which may be written:

$$\frac{1}{(\delta \rho)}\frac{\partial(\delta \rho)}{\partial z} = \frac{1}{\rho}\frac{\partial \rho}{\partial z}\eta^2 \quad (43)$$

or $$\alpha \delta_\rho = \eta^2 \alpha_\rho = \eta^4 \alpha \text{ linear} \quad (44)$$

where $$\alpha_\rho \equiv -\frac{1}{\rho}\frac{d\rho}{dx} \equiv \text{ attenuation coefficient.}$$

As the saturation factor, $\eta^2 \rightarrow 0$, the absorption of added energy approaches zero more rapidly than the absorption of the total energy.

These equations will be useful in calculating the degree of saturation necessary to achieve a given signal gain in any real embodiment of the "constant loss" amplifier and modulator described hereinbefore.

LIGHT FREQUENCY AMPLIFIER UTILIZING CONSTANT LOSS MEDIA

Constant loss amplifiers according to the present invention have the interesting characteristic that theoretical considerations indicate that the effectiveness of such amplifiers will be greater as the frequency is increased, i.e., for shorter wave length radiation.

The invention accordingly is adaptable for amplification at frequencies as high and higher than that of visible light. Apparatus for amplification at light frequencies is illustrated in FIGURE 8. It will be noted from FIGURE 8 that amplification at light frequency may be achieved in freely propagating signals rather than in transmission line structures as illusrtated in FIGURE 7 for radio frequency amplifiers.

In FIGURE 8, a light input signal 180 is received, which may be from a distant light source, for example. The light signal 180 is collected by a lens 181, and a further lens 182 may be utilized to substantially collinate the light signal into a beam of suitably small dimensions. Obviously, the lenses 181 and 182 may be replaced by other optical-collecting apparatus, such as mirrors, or may be omitted if the signal to be amplified is already in a suitable form such as a collimated and concentrated beam. The signal 180 passes through an opening 184 in a parabolic reflector 183 to impinge upon a slab 185 of constant loss material.

As an example of a constant loss material for use of light frequencies, ruby crystal has suitable absorption characteristics. The absorption of approximately 6,940 Angstroms is useful. This is particularly convenient since a ruby laser can be utilized to generate the carrier signal. A constant loss amplifier utilizing ruby is not be confused with a laser amplifier utilizing ruby. The mode of operation is distinctily different. Each form of amplifier may find specific applications and the constant loss light amplifier is believed to provide potential advantages with respect to low noise amplification.

Constant loss materials for light amplification are not limited to solids but may be found in gaseous or liquid state.

Generally speaking, the frequency for which a constant loss material is suitable is determined by the nature of the transition which gives rise to the absorption line. Electronic transitions are generally responsible for absorption frequencies in the visible light region. Vibrational state transitions are usually responsible for absorption lines in the near Infrared. Far Infrared or microwave frequency absorptions are usually due to rotational state transitions.

Major considerations in the selection of constant loss media of light frequency are strong absorption with a saturable resonance and coincidence of the resonant frequency with a frequency at which coherent light radiation is produceable for use as a carrier signal, for example, overlapping an output frequency of a laser material.

Two groups of light frequency constant loss materials meet the necessary qualifications. The first group comprises materials which meet qualifications for a saturable resonance and are also laser materials for the same frequency. Ruby crystal is an example of such material.

A second group of materials are those materials, principally gases which have numerous closely spaced, frequently overlapping spectral lines so that finding one of the many absoption lines coincident with a laser output frequency would not be difficult. Such gases are $I_2$, H, Cl, HBr, HI, $H_2O$, TlI, TlBr, TlCl, $O_2$, and $S_2$.

Table II gives numerous light frequency constant loss materials with a spectrum portion in which very predominant lines are found.

TABLE II

| Constant loss medium: | Spectrum portion |
|---|---|
| $Al_2O_3$: Cr (ruby) | Visible (specifically 6940 A.). |
| $I_2$ | Visible (particularly 5350 A. with thallium laser). |
| HCl | Infrared. |
| HBr | Infrared. |
| HI | Infrared. |
| $H_2O$ | Infrared. |
| TlI | Ultraviolet. |
| TlBr | Ultraviolet. |
| TlCl | Ultraviolet. |
| $O_2$ | Ultraviolet. |
| $S_2$ | Ultraviolet. |

Obviously, the constant loss material 185 will be selected to have an appropriate resonance frequency, in most cases it will be centered not far from the frequency of the light signal 180.

To achieve constant loss amplification in the constant loss medium 185, it will be desired to supply a carrier signal different in frequency from the light input signal 180 and substantially greater in amplitude to impinge upon the constant loss slab 185. This carrier signal is supplied from a coherent light generator 186 which may take the form of a laser light generator, sometimes called an optical maser. And specifically may be supplied by a ruby laser at 6940 A.

As in previous apparatus, the frequency of the carrier signal (from coherent light generator 186) is within the resonance frequency of constant loss, material and, for the purpose of illustration, the material 185 will be considered to be ruby.

A collimated, coherent light output signal 187 is provided from coherent light generator 186. Partially reflecting mirrors 188, 189, and 191 extract portions of the light energy from the light signal 187 and a portion of the light signal 187 is transmitted through mirrors 188–191 and reflected by mirror 192, which may be substantially totally reflecting, to parabolic mirror 183, from where it is concentrated on constant loss slab 185.

It will thus be seen that the carrier signal 187 and the input signal 180 are propagated through the constant loss slab 185 in such a way that their electromagnetic fields are substantially additive. If it is now considered that coherent light radiation is similar to radio frequency radiation in that they are both forms of electromagnetic radiation differing primarily in frequency, then it will be apparent that constant loss amplification of the input signal 180 will take place in the course of propagation through the constant loss slab 185 in virtually the same manner previously described for lower frequency signals.

While the constant loss slab 185 has been considered to be a solid material, it is obvious that it could equally well comprise a container of liquid or gaseous material. The thickness of the constant loss absorber 185 will be determined to achieve the desired factor of absorption to provide optimum gain in conformance with the design characteristics of the amplifier.

As previously explained, the gain of a single stage of a constant loss amplifier is rather modest and it is therefore desirable to provide multi-stage amplifier apparatus. Accordingly, further stages of amplification are provided in FIGURE 8.

In the apparatus of FIGURE 8, a filter 193 is provided for suppressing unwanted components in the output from constant loss slab 185. For example, it may be desired to suppress the carrier and one sideband of the output from constant loss slab 185. It should be recalled that the output from a constant loss amplifier according to the present invention typically comprises a signal having frequency components at the carrier frequency, at the input signal frequency, and an additional sideband displaced from the carrier frequency by an amount equal to but in an opposite direction from the signal frequency.

The filter 193 may therefore be utilized to select substantially only that portion of the output from slab 185 which corresponds to the input signal frequency, and in such case, the following stage of amplification will operate in substantially the same manner as did the first stage. It should be noted that in some cases the presence of the carrier signal and other sideband signals may be innocuous, and the filter 193 may be omitted.

The second stage of amplification in the apparatus of FIGURE 8 includes the previously described partially transparent mirror 191, a parabolic reflector 194 having an opening 195 for the amplified signal, a contsant loss slab 196, and a filter 197.

The third stage of amplification in the apparatus of FIGURE 8 comprises partially reflecting mirror 189, parabolic reflector 198 having an opening 199, and a slab 201 of constant loss material.

The last stage of amplification comprises partially reflecting mirror 188, parabolic reflector 202 having an opening 203, and a slab 204 of constant loss material.

The operation of succeeding stages of the amplifier is substantially the same as that described for the first stage.

It will be noted that in the successive stages of amplification the slabs of constant loss material are shown to be thicker. This diagrammatically represents the fact that the absorption factor may differ in progressive stages, and advantages may accrue, for example, by providing greater absorption factors for successive stages.

It should also be noted that the amount of carrier power supplied to successive stages will generally be greater, since the amplified signal will have a greater amplitude as it passes through successive stages of amplification. The arrangement shown in FIGURE 8, wherein the coherent light generator 186 feeds the latter stages first and the residuum from the coherent light generator is fed to the first stage, provides a convenient method of supplying the graduated power values to the various stages.

As previously explained, the output from a constant loss amplifier may be considered to comprise the carrier signal amplitude-modulated by a signal representing the difference between the carrier signal and the input signal. If the modulated carrier is supplied to a detector, the detector output will represent the difference between the carrier frequency and the input signal frequency. As is well known, particularly in the art of radio communication, any intelligence carried by the original input signal will be substantially reproduced on the difference frequency signal.

In FIGURE 8, the apparatus is arranged to produce a heterodyne effect by the placement of a photodetector 205 to receive the output from the last stage of amplification directly from constant loss slab 204, without filtering thereof. It will be understood that the photodetector 205 should have a sufficiently high frequency response to detect variations in the amplitude of the output from constant loss slab 204 at a frequency equal to the difference between the input signal frequency and the carrier signal frequency. This may be a radio frequency in a typical case.

As indicated in FIGURE 8, the number of stages of amplification is not limited to four, but they may be greater or less, as indicated by the particular requirements to be met. Numerous other variations in the apparatus may, of course, be made, relating to the arrangement of the optical elements, the type of final output extracted, or other of the features shown for purposes of a specific illustration.

SUB-CENTIMETER WAVE LENGTH APPARATUS

A specific form of apparatus for carrying out constant loss amplification at a frequency of approximately 80,000 megacycles is illustrated in FIGURES 9 through 15. These figures also illustrate a preferred method of fabrication of the apparatus, which is, because of the high frequency involved and other factors, very small in size and acocrdingly requires fairly strict attention to maintenance of dimensional tolerances.

In the apparatus of FIGURES 9 through 15 the "constant loss" medium comprises rutile, a portion of which is doped with iron ions.

In a typical rutile crystal the iron concentration may be .1 percent approximately by weight.

Rutile ($TiO_2$) has a dielectric constant approaching 100 so that a wave guide filled with rutile will have a dimension approximately one-tenth that of an air-filled wave guide for the same frequency signal. This renders the structure for constant loss amplification rather small at high microwave frequencies (for example in the vicinity of 80,000 megacycles). The requirement for considerable precision in fabrication of the apparatus is more than compensated however by the advantages of the high dielectric constant absorbing material. One advantage of this high dielectric constant and the consequent reduction in cross section is the reduced amount of power which is required for saturation by virtue of the reduced volume of constant loss material. Another advantage accrues from the fact that the high dielectric constant reduces the velocity of the propagation in the medium which in effect gives more time for absorption of power and thus increases the absorption per unit length.

Figure 9:
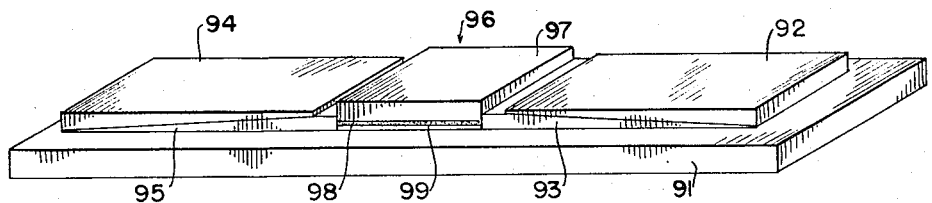

As illustrated in FIGURE 9 the preliminary assembly is begun on a backing material 91 on which there is placed a block of constant loss material 96. The block 96 preferably comprises a sandwich including a thin slab of rutile 99 which is not doped, a further thin slab of rutile 98 doped, for example, with iron ions in a concentration of approximately .1 percent by weight. A thicker slab 97 of undoped rutile completes the sandwich. It may be noted that the block 96 will later be processed to remove the excess material in slab 97.

It should be noted at this point that the general nature of the process of fabrication is to electroform the waveguide structure around the constant loss material and mandrels to obtain the desired waveguide configuration after which the mandrels may (in some cases) be dissolved out of the structure.

Adjoining each end of the block 96 are wedges 92, 93, 94 and 95. Wedges 93 and 95 are formed of rutile to provide a gradual transition to the high dielectric constant of rutile in the waveguide transmission line and to provide a transition from that high dielectric constant back to the lower dielectric constant of the remainder of the transition line.

Wedges 92 and 94 are mandrels which may be formed of aluminum in order that they may be etched out of the electro formed copper waveguide so that the volume they occupied will be airfilled in the completed structure.

Alternatively mandrels 92 and 94 may be formed of crystalline quartz as a permanent part of the structure. Since quartz has a low dielectric constant it will provide a suitable wedge for transition purposes. Quartz also has a low loss tangent at high frequencies and a coefficient of thermal expansion and a hardness roughly matching that of rutile. For the purposes of further explanation it will be assumed that the mandrel wedges 92 and 94 are formed of quartz.

It will be noted that the wedges 93 and 95 have substantially a knife edge; this may readily be accomplished by bonding each wedge 93 and 95 to its corresponding wedge 92 and 94 (with 93 and 95 being somewhat oversized in thickness) and lapping the composite slab to produce knife edges on wedges 93 to 95.

After the components of the structure shown in FIGURE 9 are bonded together a further lapping operation may be performed to reduce slab 97 to the desired dimension and to reduce wedges 92 and 94 to knife edge wedges.

Figure 10:
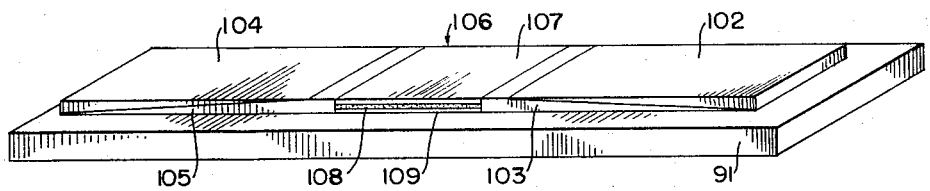

Thus the structure of FIGURE 9 is transformed into a structure illustrated in FIGURE 10 with a central slab of constant loss material 106 comprising wafers 107 and 109 of undoped rutile having sandwiched between them a wafer 108 of doped rutile, on either end of the central block 106 there are transition sections formed by wedges 102 and 104 of quartz and 103 and 105 of rutile.

Exemplary dimensions will later be given for the completed apparatus which will indicate typical dimensions for the various components being described in the process of fabrication.

Figure 11:
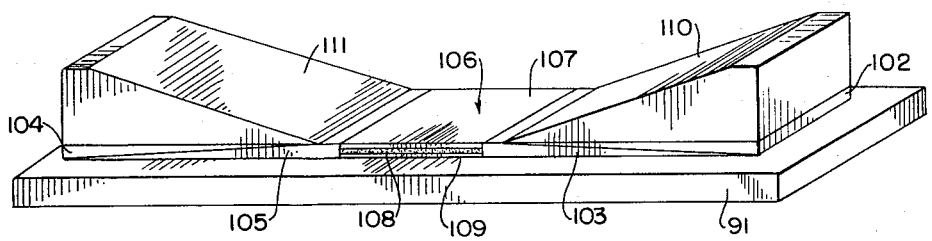

In FIGURE 11 the next step of fabrication is illustrated wherein quartz taper blocks 110 and 111 are added to the structure to provide the taper to larger dimension in the H-plane of the waveguide.

Figure 12:
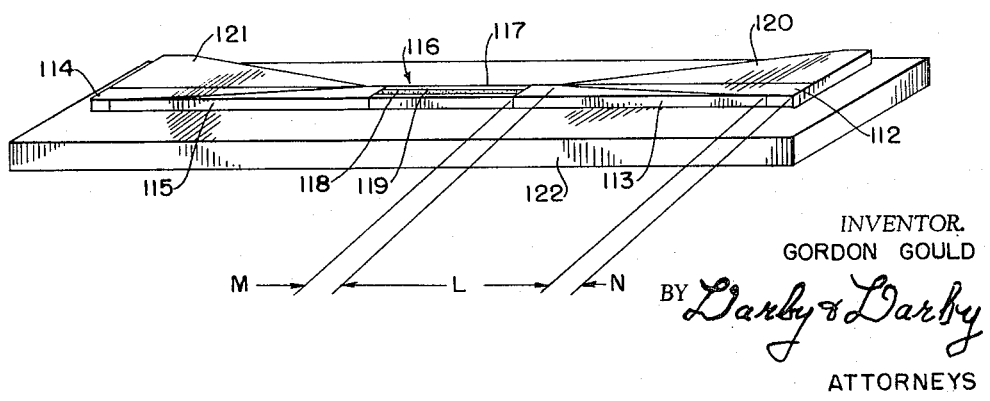

Upon the completion of the structure of FIGURE 11 wafers are cut from this structure which are then lapped and polished on each side to form a structure as illustrated in FIGURE 12. In FIGURE 12 the wafer is laid on its side on a conductive base 122 formed of copper for example. The reference numbers applied to the portions of the wafer in FIGURE 12 are in each case greater by ten than the reference numerals applied to the portions of the structure of FIGURE 11 from which the wafer was cut.

As illustrated in FIGURE 13 further mandrels 124 and 126 are placed on the structure of FIGURE 12 to form the E-plane transition of the waveguide structure. End pieces 125 and 126 may be provided to form flanges for connection of the amplifier and transition sections to the remaining waveguide transmission apparatus. The complete set of mandrels and internal parts is supported on a conductive base 123 of copper for example. The mandrels 124, 125, 126 and 127 may be either permanent or temporary as previously explained and in this particular example are constructed of aluminum which is later to be etched away.

The waveguide transmission line may be formed over the structure of FIGURE 13 by vaporizing a suitable metallic coating over the mandrels and internal structure; vaporized coatings of copper, gold or chromium may be used. The latter provides fewer fabrication difficulties but is less satisfactory from the point of view of low temperature conductivity. The transmission line structure is deposited over the vaporized coated mandrels by electroforming; copper is a suitable material for this purpose. As a specific example the vaporized coating may be copper and a periodic reversal copper cyanide bath may be used to deposit a thicker coat.

As illustrated in FIGURE 14 the electro-formed waveguide structure may be potted in a suitable slab 128 of potting material and of course the aluminum mandrels which are to be removed are eliminated by etching. Thus a completed amplifier structure 129 is illustrated in FIG- URE 14 it being understood that the end portions 132 and 133 will be arranged to form a low loss connection with standard wave guide structure.

As illustrated in FIGURE 15 the amplifier structure will be submersed in a low temperature medium such as liquid helium and low temperature cryogenic apparatus 153 of conventional type may be utilized for maintaining the amplifier at low temperatures. Waveguide transmission lines 151 and 152 provide inputs and outputs to and from the amplifier section 129. A suitable junction 154 is provided for the inputs 157 and 155 through which an input signal and a carrier frequency signal are fed to amplifier 129. A suitable stable carrier frequency oscillator 156 is provided to generate the carrier signal.

The apparatus of FIGURES 9 through 15 is intended for operation as a constant loss amplifier at 81.3 megacycles carrier frequency input. Amplification will be provided for signals close to the carrier frequency making due allowance for slight instability in the carrier frequency which is impossible to eliminate. In general, amplification will be greater for signals closer to the carrier frequency but will be provided over a substantial range of frequencies. The bandwidth will be greater as the ratio of carrier power to signal powers increase. Table III below gives exemplary dimensions for the apparatus of FIGURES 9 through 15. It will be understood that these dimensions are intended as a guide and example and are not intended to limit the scope of the invention and are subject to modification by application of the skill of those versed in the art.

TABLE III

| Dimension, angle— | Value in inches |
|---|---|
| A | 9 degrees 30 minutes. |
| B | 18 degrees 28 minutes. |
| C | .040. |
| D | .040. |
| E | .0075. |
| F | .081. |
| G | .142. |
| F | .122. |
| I | .061. |
| J | [1].015. |
| K | .020. |
| L | .320. |
| M, N | .039. |

[1] Each layer of the sandwich is .005 inch thick.

In many instances it may be desirable to tune the constant loss amplifier by a variable magnetic (for solids) or electric (for gases) field. The apparatus of FIGURE 15 may be provided with a variable magnetic field for tuning by use of conventional high field electromagnets or superconducting electromagnets. For simplicity and clarity such apparatus is omitted but the appropriate magnetic field directions (parallel to $y$ axis) is indicated by the arrows in FIGURES 14 and 15.

It should be noted that the particular waveguide structure illustrated in FIGURES 9 through 15 is presented merely for illustration and numerous variations in the structure may be devised. The principal requirement is only that a suitable constant loss medium be placed in a radio frequency transmission line.

While the structure of FIGURES 9–15 utilizes tapered transitions from the air-filled transmission line to the high dielectric constant loss medium, other forms of transitions may of course be used such as step transitions or the like. It may further be noted that separate E-plane and H-plane taper transitions are provided in the apparatus illustrated but of course a simultaneous transition structure could be utilized to provide a more compact but perhaps less easily designed structure.

ANALYSIS OF GAIN

The physical principles underlying the constant loss amplifier have been discussed and will not be repeated here. It will be useful however to derive an explicit expression for the gain of this amplifier as a function of its length and degree of power saturation. A quasi-static analysis will be utilized. An input signal with frequency close to that of the carrier signal to give the total signal a modulation period long compared to the pertinent relaxation times of the medium will be considered so that the medium response can be inferred from the non-modulated case.

Consider a rectangular waveguide shown in FIGURE 14. The entire waveguide is filled with rutile ($TiO_2$) with the optic axis oriented in the $x$ direction. The center slab 118 contains an impurity concentration of $Fe^{3+}$ (considered in this analysis to be $2 \times 10^{19}$ cm.−3). The latter is a paramagnetic substance which has an energy splitting at zero magnetic field. The direction of the magnetic moment associated with the iron ion is at right angles to the optic axis of the rutile. Consequently $H_x$ fields will induce $\Delta m = \pm 1$ magnetic dipole transitions. It is evident that the $H_y$ and $H_z$ fields will have different transition probabilities associated with them. Furthermore, because of the properties of the rutile, the dielectric constant, $\epsilon_x$, is not equal to $\epsilon_y$ or $\epsilon_z$. From the foregoing, it can be inferred that the medium is characterized by a real dielectric tensor, a real magnetic permeability scalar and an imaginary magnetic permeability tensor. Nevertheless, a TE 10 mode can be assumed to exist because of the following conditions:

First, the imaginary magnetic permeability is several orders of magnitude less than the real permeability, consequently there will be only a slight reflection at the doped-undoped interface of the plane waves constituting the mode and the medium can be treated as if it were homogeneous.

Second, since $E_x = E_z = 0$, only $\epsilon_y$ enters in the problem, so that the medium behaves as though it were isotropic with a dielectric constant $\epsilon_y$.

Third, a similar argument holds for the magnetic field in the doped medium if $2/\delta \ll 1$, since $H_y = H_z = 0$ throughout the doped region and only $Im(\mu_x)$ enters in the expression for attenuation.

Consider energy propagation in the positive $z$ direction in FIGURE 14. Designate the $x$ component of the magnetic field in the doped region due to the "carrier" or "biasing" signal as:

$$H_c \cos \omega_1 t \qquad (45)$$

where $\omega_1$ corresponds to the 81.3 kmc. transition. And similarly, let the "information" or input signal be:

$$\frac{H_s}{2} \cos(\omega_1 + \Delta\omega_1)t + \frac{H_s}{2} \cos(\omega_1 - \Delta\omega_1)t \qquad (46)$$

thus $\Delta\omega_1$ is the effective amplitude modulation frequency of the carrier and in this case will be considered to be of the order of $10^2$ c.p.s. The power associated with the sum of both signals, when averaged over a time $\tau_1$ such that $$\omega_1 > \frac{2\pi}{\tau_1} > \Delta\omega_1$$

is to first order in $H_s/H_c$.

$$P = \frac{c}{16\pi} \frac{K}{h} ab \sqrt{\frac{\mu_r}{\epsilon_y}} [H_c^2 + 2 H_c H_s \cos \Delta\omega_1 t] \qquad (47)$$

(Gaussian units)

K is the propagation vector magnitude of a plane wave and is equal to $\sqrt{\mu_r \epsilon_y} \omega/c$, $h$ is the propagation vector in the waveguide and is related to K by the equation $$h^2 = K^2 - (\pi^2/a) \qquad (48)$$

and $\mu_r$ is the real part of the magnetic permeability which is equal to unity in this case. The ratio $K/h$ can be somewhat simplified if we let $K = qK_c$ where $K_c = \pi/a$ or the propagation vector magnitude corresponding to the cutoff frequency. The ratio can then be expressed as $$\frac{K}{h} = \frac{q}{\sqrt{q^2-1}} \tag{49}$$

Expression 47 can be rewritten in terms of the carrier power, $P_c$, and signal power, $P_s$, where these quantities are the averages over a time $\tau_2$, of the powers associated with 45 and 46, respectively. The time $\tau_2$ is chosen so that $$\Delta\omega_1 > \frac{2\pi}{\tau_2}$$

It follows from these definitions that $$P = P_c + 2\sqrt{2P_cP_s} \cos \Delta\omega_1 t \tag{50}$$

The application of Poynting's theorem to a section $dz$ of the waveguide yields the following relation between the rate of change of power along the waveguide and the energy loss to the medium and the walls:

$$\frac{\partial P}{\partial z} = -\int_0^b \int_{\frac{a}{2}-\delta}^{\frac{a}{2}+\delta} Q\,dx\,dy - a_w P \tag{51}$$

where Q corresponds to the energy dissipation rate per unit volume averaged over the same time interval $\tau_1$ as P, and $a_w$ represents the fractional power loss per unit distance due to the finite conductivity of the guide walls and is given by the expression $$a_w = \frac{4\delta_r\left(\frac{\pi}{a}\right)\left[\frac{q}{2b}+\frac{1}{a}\right]}{\sqrt{q^2-1}} \tag{52}$$

At high enough temperatures $$\delta_r = \frac{1}{2}\left(\frac{c^2}{2\pi\mu_r\omega\sigma}\right)^{\frac{1}{2}}$$

where $\sigma$ is the conductivity but at lower temperatures the determination of $\delta_r$ must be accordingly modified.

The expression for Q can be written as $$Q = \frac{\hbar\omega}{2T_2} \frac{<1\mu\cdot 1H>_{23}^2}{\hbar^2} \frac{(\Delta\eta)_{23}}{(\omega_1-\omega_0)^2+\left(\frac{1}{T_2}\right)^2+\frac{T_1}{T_2}\frac{<1\mu\cdot 1H>_{23}^2}{\hbar^2}} \tag{53}$$

where $T_1$ is the spin-lattice relaxation time, $T_2$, is the spin-spin relaxation time, $<1\mu\cdot H>_{23}$ is the matrix element between states 2 and 3 (81.3 kmc. transition) of the magnetic dipole perturbation term due to the RF field $(\Delta\eta)_{23}$ is the population difference between states 2 and 3 and $\omega_0$ is the resonance frequency. In the above expression 1H represents the amplitude of the magnetic field vector which does not contain the time dependance of the high frequency component $\cos \omega_1 t$, but does contain the time dependance of the low frequency component $\cos \Delta\omega_1 t$. It is at this point that the "quasi-static" approximation is made. Because 1H has only an x component we can write that $$<1\mu\cdot 1H>_{23}^2 = <\mu_x>_{23}^2 H = g^2\mu_o^2 <S_x>_{23}^2(H_c^2+2H_cH_s \cos\Delta\omega_1 t) \tag{54}$$

where $g$ is the Lande $g$ factor (which is known to be two for this case), $\mu_o$ is the Bohr magneton and $S_x$ is the $x$ component of the spin matrix of the iron ion. The evaluation of the matrix element yields $$<S_x^2>_{23} = 5/4 \tag{55}$$

The expression for $\Delta\eta$ can be written as the number in a particular state, $N/3$ (where N is the total number of impurities per unit volume), times the Boltzmann factor $\hbar\omega_o/KT$.

$$(\Delta\eta)_{23} = \frac{N}{3}\frac{\hbar\omega_o}{kT} \tag{56}$$

Let the carrier be at resonance so that $\omega_1 = \omega_0$, insert the appropriate terms from Equations 47, 54, 55 and 56 in 53 and perform the integration indicated in Equation 51 to obtain $$\frac{\partial P}{\partial z} = \frac{-a_1 P}{1+\frac{P}{P_{sat}}} - a_w P \text{ where} \tag{57}$$

$$P_{sat} = \frac{c}{16\pi}\frac{K}{\hbar}ab\sqrt{\frac{\mu_r}{\epsilon_y}}\frac{\hbar^2}{T_1 T_2 5\mu_o^2} \text{ and} \tag{58}$$

$$a_1 = \frac{8\pi}{c}\frac{\hbar}{K}\sqrt{\frac{\epsilon_y}{\mu_r}}\frac{\omega_o^2 N T_2 5\mu_o^2 F}{3kT} \text{ where} \tag{59}$$

$$F = \frac{2\delta}{a} \tag{60}$$

is the "filling factor."

In the integration in Equation 51 the power at the center $$x = \frac{a}{2}$$

is taken as constant over the interval $2\delta$. Because of the cosine dependance of the field this will introduce less than a 10% error for values of $$F < \frac{1}{3}$$

It is noted that $a_1$ depends on the propagation mode thru the ratio $\hbar/K$ in 59. At first sight one would expect the $a_1$ to become large as the cutoff condition $h=0$ and $q=1$ is approached. This cutoff is evident in 52 as far as the wall losses are concerned but as far as the medium itself is concerned, it becomes more transparent as cutoff is approached. The reason for this behaviour is that $H_x$ approaches zero at cutoff whereas $H_z$ which determines the wall losses becomes very large. The effect of the large dielectric constant in rutile is seen from the above expressions to be two-fold. For a given $q$, it reduces the saturation power requirements by $\epsilon_y^{1.5} \approx 700$ and increases the attenuation in the medium by a factor $\epsilon_y^{.5} \approx 9$.

To get a numerical estimate of $a_w$, $a_1$ and $P_{sat}$, take $\epsilon_y = 80$, $\delta_r = 5 \times 10^{-6}$ cm., $F = \frac{1}{3}$, $N = 2 \times 10^{19}$ cm.$^{-3}$, $f = 81.3$ kmc., $q = 2.16$, $T_2 = .91 \times 10^{-8}$ sec.,
$T_1 = 3.15 \times 10^{-5}$ sec.
$T = 4.2°$ K., $a = .0446$ cm. and $b = .0173$ cm. Inserting these values in the appropriate equations yields $$a_w = .115 \text{ cm.}^{-1}$$

which is equivalent to a power attenuation of 50 db/meter. At room temperature this would be one order of magnitude higher. The attenuation in the medium is $a_1 = 25.8$ cm.$^{-1}$ which is 3 db per wavelength. This large attenuation can be reduced by decreasing the filling factor or decreasing the concentration. The range of $a_1$ from the point of view of a practical device will be considered later. The saturation power $P_{sat} = 5.25 \times 10^{-5}$ watts which is quite small by virtue of the high dielectric constant of the rutile. This quantity can be further decreased by lowering the impurity concentration.

Equation 57 from which the gain characteristics of the medium will be derived can be rewritten in the form $$\frac{\partial P'}{\partial z} = \frac{-a_1 P'}{1+P'} - a_w P' \text{ where} \tag{61}$$

$$P' = P/P_{sat} \tag{62}$$

Substituting 50 in 51, working to first order in $\sqrt{P_s/P_c}$ and equating the coefficients of the term $\cos\Delta\omega_1 t$ on both sides of Equation 61 yields for the fractional gain per unit length $$a_G = \frac{1}{P_s'}\frac{dp_s'}{dz} = (\epsilon^2 - 2\epsilon^4)a_1 - a_w \tag{63}$$

equating the other terms yields $$a_s = \frac{1}{P_{c'}} \frac{dP_{c'}}{dz} = -\epsilon^2 a_1 - a_w \text{ where} \quad (64)$$

$$\epsilon^2 = \frac{1}{1+P_{c'}} \quad (65)$$

is a saturation factor which is small and equal to $\eta^2$ when the medium is strongly saturated and unity when it is not saturated.

Some of the properties of Equation 63 will now be considered. The maximum $a_G$ occurs at $$\epsilon^2 = \frac{1}{4} (P_{c'} = 3)$$

and is $$a_{Gm} = \frac{a_1}{8} - a_w$$

Furthermore when the medium is not saturated and $\epsilon^2$ is close to unity $$\frac{d\ln P_{s'}}{dz} = \frac{d\ln P_{c'}}{dz} = -(a_1 + a_w) \text{ and } a_G = a_s \quad (66)$$

When the medium is saturated to a degree such that $$\frac{a_w}{a_1} < \epsilon^2 < 1 \quad (67)$$

it follows that $$\frac{d\ln P_{s'}}{dz} = \frac{-d\ln P_{c'}}{dz} = \epsilon^2 a_1 \quad (68)$$

and $a_G = -a_s$.

To evaluate the total gain from the above expressions, solve for $dz$ in terms of $dP_{c'}$ and $P_{c'}$ from Equation 64 and insert this in Equation 63 which may be integrated to yield $$G = \frac{P_{s'}(z)}{P_{s'}(0)} = \frac{P_{c'}(z)}{P_{c'}(0)} \left[ \frac{1+P_{c'}(0)}{1+P_{c'}(z)} \frac{1+a_1/a_w + P_{c'}(z)}{1+a_1/a_w + P_{c'}(0)} \right]^2 \quad (69)$$

where $P_{s'}(0)$ is the incident signal power and $P_{c'}(0)$ is the incident carrier power. Similarly, Equation 65 can be integrated to yield $$-(a_1 + a_w) z$$

$$= \frac{a_1}{a_w} \ln \left[ \frac{1+a_1/a_w}{P_{c'}(0)} + \frac{P_{c'}(z)}{P_{c'}(0)} \right] \left[ \frac{1+a_1/a_w}{P_{c'}(0)} + 1 \right]^{-1} + \ln \frac{P_c(z)}{P_c(0)} \quad (70)$$

Figure 17:
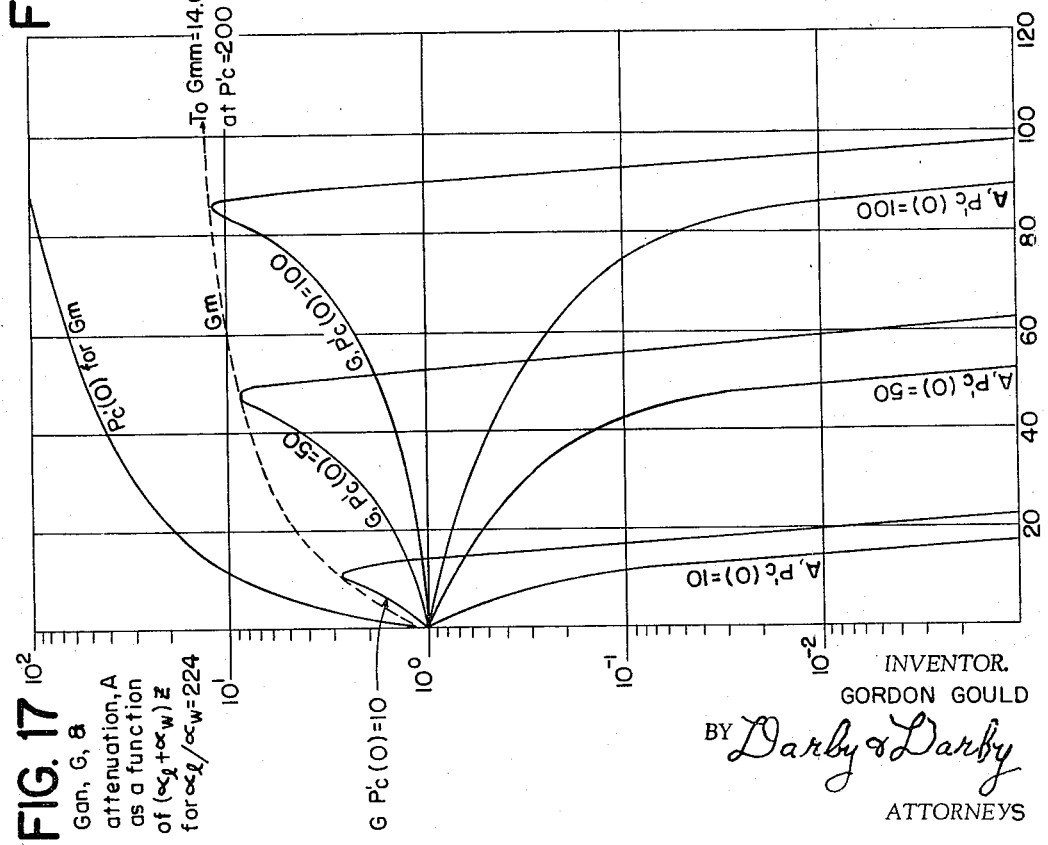
FIGURE 17 is a graph of gain and total attenuation (calculated) as a function of attenuation factors.

Equations 69 and 70 are valid to all orders of $a_w/a_1$ and can be used to determine the carrier attenuation, $$A = P_{c'}(z)/P_{c'}(0)$$

and the signal gain, $G$, as a function of $(a_1 + a_w)z$ and $P_{c'}(0)$. This information is represented for $a_1 + a_w = 224$ as a family of curves of $A$ and $G$ as a function of $(a_1 + a_w)z$ using $P_{c'}(0)$ as a parameter in FIGURE 17. It is seen from these plots that as the signal traverses the medium it is first subject to the condition described by 68 where the A and G curve are mirror images of each other in the abscissa. The largest $a_G$ occurs at $P_{c'}(z) = 3$. The maximum amplification, $G_m$, occurs at $$P_{c'}(z) = 1 + 4 \frac{a_w}{a_1} \left( \text{to first order in } \frac{a_w}{a_1} \right)$$

and then is subject to a large constant attenuation as indicated by Equation 66. The dotted curve indicates the maximum gain $G_m$ that can be achieved for a given length medium. The incident power required to achieve this gain is also indicated.

The effect of the finite $a_1/a_w$ is as follows: First, there is a deviation from the condition specified in 67 which becomes more pronounced as $P_c(0)$ becomes comparable to $a_1/a_w$. This is clearly evident for the $P_c(0) = 100$ curve and is not pronounced for the $P_c(0) = 10$ curve. Furthermore, the apparent saturation with distance of the maximum gain curve, $G_m$, is a consequence of the finite $a_1/a_w$. Actually the $G_m$ curve goes through a maximum value $G_m$ at $P_c(0) = a_1/a_w$ which is given for the values considered here by $$G_{mm} \approx \frac{a_1}{16 a_w} = 14 \quad (71)$$

$G_{mm}$ is the maximum gain that can be expected for *any* medium length and incident power, for a single amplifier section fed at one end and with $$\frac{a_1}{a_w} = 224.$$

Practical considerations of length and power will no doubt require operation at much smaller values of gain. It is seen from Expression 71 that $a_1$ must be at least several orders of magnitude greater than $a_w$ to give useful gains. On the other hand, $a_1$ cannot be increased indefinitely because of the requirements that the attenuation per wavelength be fairly small. The factor of 10 decreases in $a_w$ as a result of lowering the temperature to 4.29° K. is therefore seen to be an important factor. High dielectric loss which would tend to increase the effective $a_w$ would seriously degrade the efficiency of the device.

It is useful to present the above data in a somewhat different manner. Firstly, Equations 69 and 70 can be solved to yield $G$ as a function of $P_{c'}(0)$ for a given $(a_1 + a_w)z$. Secondly, these equations can be given for the case $a_w/a_1 = 0$ so that the effect of the wall losses can be clearly seen. For $a_w/a_1 = 0$ $$G = \frac{P_{s'}(z)}{P_{s'}(0)} = \frac{P_{c'}(z)}{P_{c'}(0)} \left[ \frac{1+P_{c'}(0)}{1+P_{c'}(z)} \right]^2 \quad (72)$$

and $$-a_1 z = \ln \left[ \frac{P_{c'}(z)}{P_{c'}(0)} \right] + P_{c'}(z) - P_{c'}(0) \quad (73)$$

Figure 18:
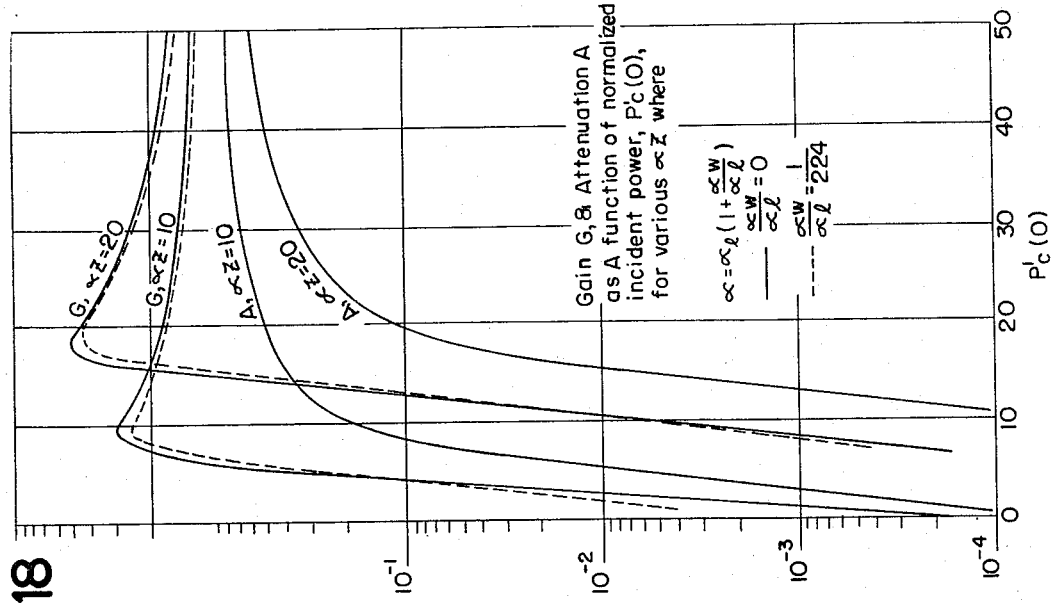
FIGURE 18 is a graph of gain and attenuation (calculated) as a function of incident carrier power.

The data is shown graphically in FIGURE 18. The no loss case is compared to the lossy case for values of $az = 10, 20$. The smoothing tendency of the wall losses (The "wall" loss, $a_w$, can be generalized to include all linear power losses, i.e., where $d\ln P/dz = $ constant.) is noted. It should further be noted that at values of $P_{c'}(0) \ll 1$, the gain $G$, flattens out and approaches $e^{-az}$ as expected (not shown).

The foregoing theoretical analysis has been presented to aid in the understanding of the invention according to the present understanding of the inventor and also as a guide in carrying out the invention by those of skill in the art. It should be appreciated however that the analysis is not intended to be exact in all cases nor is it intended as a basis for the operability and utility of applicant's invention, which of course cannot depend upon the accuracy of any theoretical analysis but is predicated upon actual operation of the apparatus.

An interesting and useful characteristic of the particular microwave structure in FIGURES 9 through 15 is that it may be utilized substantially without change as a maser amplifier.

Maser (microwave amplification by stimulated emission of radiation) action is a distinctly different phenomenon from constant loss amplification and accordingly the frequency of signals required for utilization of the apparatus of FIGURES 9 through 15 as a maser amplifier would be different from those previously described when the apparatus is used as a constant loss amplifier.

Figure 16:
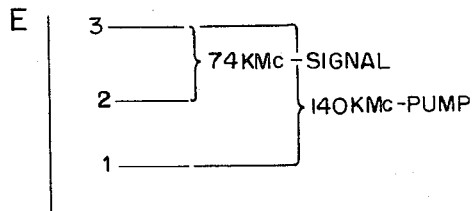
FIGURE 16 is an energy level diagram illustrating how the apparatus of FIGS. 14 and 15 can alternatively be operated as a maser amplifier rather than as a constant loss amplifier.

Operation of the apparatus as a maser amplifier may be understood by reference to the energy level diagram illustrated in FIGURE 16.

While it is likely that several groups of energy levels in rutile may be appropriate for maser action, a specific example of energy levels is illustrated in FIGURE 16. The levels have been arbitrarily designated 1, 2 and 3 from lower to higher energy.

For operation as a maser amplifier a pump frequency of 140 kmc. would be utilized to depopulate level 1 and populate level 3. Upon the application of sufficient pump power in accordance with well-known maser technique, energy level 3 will become more highly populated than energy level 2 producing a "negative temperature" condition or a population inversion. When such a condition exits in the maser material a signal having a frequency (74 kmc.) corresponding to the energy difference between levels 3 and 2 will be amplified upon passing through the maser medium by the phenomenon of microwave amplification by stimulated emission of radiation.

The theory and operation of such devices is well known and will not be discussed in detail. It is the purpose here merely to point out that the structure of FIGURES 9 through 14 and its method of construction is applicable to maser devices as well as constant loss amplifiers.

GASEOUS TUNABLE CONSTANT LOSS AMPLIFIER

FIGURE 19 is a partially schematic diagram of constant loss amplifier apparatus according to the present invention utilizing a gaseous constant loss medium and which is tunable over a substantial frequency range.

The amplifier apparatus 201 comprises as its central portion a section of dielectric waveguide indicated at 202 which may comprise an elongated hollow quartz cylinder dimensioned to provide a circular $TE_{01}$ waveguide for the transition frequency of the gaseous working medium to be employed.

The chamber 203 enclosed by the cylinder 202 is filled with a suitable gaseous constant loss medium which may be selected from Table 1 and as a specific example may comprise $H_2C^{12}O^{16}$. Suitable fittings such as flanges 204 are provided to connect the dielectric waveguide structure 202 to more convenient hollow metal input and output waveguides 205 and 206. If desired, standard transitions from rectangular to circular and circular to rectangular waveguide may be utilized so that the remainder of the system in which the amplifier apparatus 201 is incorporated may utilize the more common rectangular form of waveguide. Obviously the transitions employed must be suitable to launch the proper mode into the circular dielectric waveguide 202 (in this case the $TE_{01}$ circular mode). A conduit 209 connecting into input waveguide 205 may be provided for injecting and maintaining the gaseous working medium in the chamber 203 of the circular dielectric waveguide 202. A gas reservoir 211 is provided and, of course, standard techniques may be utilized to control the pressure of the gas in the chamber 203 to maintain one atmosphere or other suitable pressure.

Windows 207 and 208 are provided in waveguide sections 205 and 206, respectively, to enclose the gaseous working medium in the chamber 203.

It has previously been mentioned that the frequency of transitions in solid constant loss materials is conveniently tuned by applying a variable magnetic field while gaseous working mediums are conveniently tuned by an electric field. The use of dielectric waveguide rather than metal waveguide in the apparatus of FIGURE 19 makes it possible to readily create a direct current variable electric field through the working medium transverse to the direction of propagation of the radio frequency signal.

Such a field is provided by plates 212 and 213 of conductive material which are connected by leads 214 and 215 to a variable voltage source 216 of conventional design.

The zero-filled transition frequency of $H_2C^{12}O^{16}$ is approximately 72,840 megacycles. Tunability on the order of 15,000 megacycles is obtainable by application of voltages of practical magnitude to the plates 212 and 213.

It will be appreciated that the operation of the device of FIGURE 19 is, except for the electrical-field tuning, the same as that for previously described constant loss amplifier apparatus. That is, the injection of a carrier signal of large magnitude together with an information signal of relatively smaller magnitude at the input waveguide 205 will result in the absorption of the composite signal by the constant loss medium such as to increase the amplitude of the information signal component emitted at the output waveguide 206. It is understood that the information signal frequency would be different from the carrier signal frequency, both of which would be approximately at the transition frequency of the constant loss medium (which is of course controllable by the electrical field generated between plates 212 and 213).

The design of solid dielectric waveguide is well known in the art but for a better general understanding of the invention it may be pointed out that typical dimensions for the apparatus of FIGURE 19 utilizing as a constant loss medium $H_2C^{12}O^{16}$, would be 12 inches in length for the constant loss medium filled circular waveguide. It will be understood that ideally the constant loss medium should be restricted to the volume between plates 212 and 213 for maximum tunability but that a slight departure from this ideal situation may be utilized for practical reasons.

The waveguide diameter for the frequency of approximately 72,000 megacycles may be on the order of .072 inch. It will frequently be found desirable to operate the apparatus close to the cutoff frequency for circular waveguide 202 to reduce the length of apparatus required for a desired attenuation.

It will be appreciated that the apparatus illustrated in FIGURE 19 is merely illustrative of various types of constant loss apparatus using gaseous media. For example a particularly desirable working medium is deuterium cyanide $DC^{12}N^{14}$. Deuterium cyanide is favorable from the point of view of substantial gain in a relatively short length of working medium an din other respects, but it is not suitable for a tunable apparatus. The dimensions given by way of an example for apparatus utilizing $H_2C^{12}O^{16}$ are also suitable for apparatus utilizing deuterium cyanide which has a transition at approximately the same frequency (see Table 1).

It will be appreciated that the apparatus of FIGURE 19 is subject to numerous variations particularly those suggested in discussion of other embodiments. For example the apparatus of FIGURE 19 may be duplicated to provide multiple stages of amplification and it may be placed in a system such as illustrated in FIGURE 15 whereby the constant loss medium is retained at low temperatures.

The use of circular $TE_{01}$ mode propagation in the constant loss medium provides relatively low wall losses in metal waveguide at high frequencies. Accordingly a constant loss amplifier may be built having substantial length and still provide a net gain over wall losses. The capability of providing a distributed amplifier makes it practical in some cases to combine amplifier with transmission line rather than having lumped repeater amplifiers separated by attenuating sections of transmission line. Consider, for example, a transmission line from a receiving antenna tower. Such a line frequently has losses so great that a preamplifier is required at the antenna. By substituting an extended-length constant loss amplifier for the transmission line, a gain rather than a loss may be provided. No complex apparatus is required at the antenna, it only being necessary to transmit the carrier frequency power to the antenna to be fed into the amplifier-transmission line along with the received signal. For longer transmissions carrier-frequency power could be introduced at numerous (but substantially spaced) points.

From the general description of the process of constant loss amplification and the description of the various embodiments of apparatus for such amplification it will be understood that a new form of amplification is provided which is particularly advantageous in that it has an inherent simplicity, it is particularly adapted for sub-centimeter frequencies and has a tendency to increase in efficiency with decrease in wavelength thus giving promise of substantially extending the usable radio frequency spectrum.

It should be understood that the invention is not limited to the various embodiments shown and that numerous modifications will be apparent to those of skill in the art in addition to those shown or suggested herein. Accordingly, it is desired that the invention not be limited to those embodiments and modifications shown or suggested but that the scope be determined by reference to the appended claims.

What is claimed is:

1. Apparatus for amplification of electromagnetic signals comprising, a substantially constant loss medium having a greatly reduced short term average power adsorption factor for short term average power values substantially above a predetermined saturation power value, means for applying a carrier signal of sufficient power to create said greatly reduced short term average power absorption factor in said medium, means for superimposing on said carrier signal an electromagnetic information signal to be amplified, said information signal to be amplified having a much smaller magnitude than said carrier signal, and means for propagating said combined carrier signal and superimposed information signal through said medium thereby to amplify said information signal component while diminishing the amplitude of said carrier signal component.

2. Apparatus as claimed in claim 1 wherein said signals induce currents in said medium and said medium presents a power sensitive resistance to said current resulting in substantially constant loss characteristics for said medium.

3. Apparatus as claimed in claim 1 wherein said medium is a solid.

4. Apparatus as claimed in claim 1 further including filter means connected to receive the signal transmitted through said medium, said filter characteristic being adapted to suppress said carrier signal frequency.

5. Apparatus for amplification of radio frequency electromagnetic signals comprising a substantially constant loss medium having a greatly reduced short term average power absorption factor for short term average power values substantially above a predetermined saturation power value, means for generating and applying a stable radio frequency carrier signal of sufficient power to create said greatly reduced short term average power absorption factor in said medium, means for combining with said carrier signal a radio frequency information signal to be amplified, said information signal to be amplified having a much smaller magnitude than said carrier signal, and means for propagating said combined carrier signal and combined information signal through said medium including a radio frequency transmission line connected to receive the combined signals and having said constant loss medium disposed in the electromagnetic field region thereof, whereby said information signal component of the combined signals is amplified and the amplitude of said carrier signal component is diminished.

6. Apparatus for amplification of light signals within a predetermined range of frequencies comprising a substantially constant loss medium having a greatly reduced short term average power absorption factor for short term average power values substantially above a predetermined saturation power value, said medium including a substance having energy levels separated by energizes approximately corresponding to frequencies in said predetermined range, means for applying a coherent light carrier signal of sufficient power to create said greatly reduced short term average power absorption factor in said medium, means for superimposing on said carrier signal light information signal to be amplified, said information signal to be amplified having a much smaller magnitude than said carrier signal, and means for propagating said combined carrier signal and superimposed information signal through said medium thereby to amplify said information signal component while diminishing the amplitude of said carrier signal component.

7. Apparatus as claimed in claim 5 wherein said transmission line is a rectangular waveguide.

8. Apparatus as claimed in claim 5 wherein said transmission line is a hollow dielectric waveguide.

9. Apparatus as claimed in claim 8 further including means for generating a D.C. electric field through said dielectric waveguide, whereby such apparatus may be tuned electrically.

10. Apparatus as claimed in claim 5 further including reflecting means for causing said signals to retraverse said medium for further interaction therewith.

11. Apparatus as claimed in claim 5, wherein said medium is a gas.

12. Apparatus for amplification of electromagnetic signals within a predetermined range of frequencies comprising a substantially constant loss medium, said medium including a substance having energy levels separated by energies approximately corresponding to frequencies in said predetermined range, said constant loss medium having a greatly reduced short term average power absorption factor for short term average power values substantially above a predetermined saturation power value, means for applying a carrier signal of sufficient power to create said greatly reduced short term average power absorption factor in said medium, said carrier signal having a frequency approximately that of frequencies corresponding to said separation between said energy levels, means for superimposing on said carrier signal an electromagnetic information signal to be amplified, said information signal to be amplified having a much smaller magnitude than said carrier signal, and means for propagating said combined carrier signal and superimposed information signal through said medium thereby to amplify said information signal component while diminishing the amplitude of said carrier signal component.

13. Apparatus as claimed in claim 12 wherein said substance is a gas having linear molecules.

14. Apparatus as claimed in claim 12 wherein said substance is a gas having symmetric top molecules.

15. Apparatus as claimed in claim 12 wherein said substance is a paramagnetic molecular gas.

16. Apparatus as claimed in claim 12 wherein said substance is a hologen-containing compound.

17. Apparatus as claimed in claim 12 wherein said substance is a cyano-containing compound.

18. Apparatus as claimed in claim 12 wherein said substance comprises an unnatural concentration of one isotope of a poly-isotopic element.

19. Apparatus as claimed in claim 12 wherein said substance is TlCl.

20. Apparatus as claimed in claim 12 wherein said substance is ICN.

21. Apparatus as claimed in claim 12 wherein said substance is HCN.

22. Apparatus as claimed in claim 12 wherein said substance is DCN.

23. Apparatus as claimed in claim 12 wherein said substance is HCCCN.

24. Apparatus as claimed in claim 12 wherein said substance is $CH_3F$.

25. Apparatus as claimed in claim 12 wherein said substance is $NH_3$.

26. Apparatus as claimed in claim 12 wherein said substance is HCl.

27. Apparatus as claimed in claim 12 wherein said substance is $LiNH_2$.

28. Apparatus as claimed in claim 12 wherein said substance is HDO.

29. Apparatus as claimed in claim 12 wherein said substance is $IrF_6$.

30. Apparatus as claimed in claim 12 wherein said substance is IBr.

References Cited by the Examiner

UNITED STATES PATENTS

| | | | |
|---|---|---|---|
| 2,762,871 | 9/1956 | Dicke | 330—4 |
| 2,883,481 | 4/1959 | Tien | 330—4 |
| 2,929,922 | 3/1960 | Schwlow et al. | 330—5 |
| 2,950,442 | 8/1960 | Scovil et al. | 330—5 |
| 3,012,203 | 12/1961 | Tien | 330—4.6 |
| 3,205,370 | 8/1965 | Ashkin et al. | 330—4.3 |

FOREIGN PATENTS 1,258,072    2/1961    France.

OTHER REFERENCES

Geusic et al.: "Journal of Applied Physics," July 1959, pp. 1113–1114.

Gould et al.: "Physical Review," May 15, 1963, pp. 1460–1465.

ROY LAKE, *Primary Examiner.*

D. R. HOSTETTER, *Assistant Examiner.*